United States Patent [19]
Thomson et al.

[11] Patent Number: 5,880,954
[45] Date of Patent: Mar. 9, 1999

[54] CONTINOUS REAL TIME SAFETY-RELATED CONTROL SYSTEM

[76] Inventors: Robert Thomson, 7 Industrial Dr. South, Smithfield, R.I. 02917; Frederick Thomson, 10 Fenner Grant La., Cumberland, R.I. 02864

[21] Appl. No.: 567,033

[22] Filed: Dec. 4, 1995

[51] Int. Cl.[6] .............................. G05B 9/02; G01V 8/10
[52] U.S. Cl. .......................... 364/184; 364/185; 364/186; 364/551.02; 364/468.18; 250/221; 250/224; 361/191; 361/202; 73/865.7; 73/865.9; 340/541; 340/679; 340/680; 340/686; 377/16; 377/17; 377/20
[58] Field of Search ..................... 364/184, 185, 364/186, 551.01–551.02, 550, 468.18; 361/191, 1, 202; 250/221, 224; 439/160; 187/317; 340/679, 680, 644, 686, 687, 506, 507, 532, 541, 154; 377/15–17, 20; 73/865.7–865.9; 395/184.01, 182.22, 185.04

[56] References Cited

U.S. PATENT DOCUMENTS

| | | | |
|---|---|---|---|
| 3,987,283 | 10/1976 | Moeller | 364/185 |
| 4,075,961 | 2/1978 | Harris . | |
| 4,650,990 | 3/1987 | Jonsson | 250/221 |
| 4,724,505 | 2/1988 | Gelbort | 361/167 |
| 4,818,866 | 4/1989 | Weber | 250/221 |
| 4,821,201 | 4/1989 | Kawamura et al. . | |
| 4,988,983 | 1/1991 | Wehrer | 345/175 |
| 5,000,692 | 3/1991 | Taniguchi et al. | 439/160 |
| 5,015,840 | 5/1991 | Blau | 250/221 |
| 5,149,921 | 9/1992 | Picado | 187/317 |
| 5,218,196 | 6/1993 | Dogul et al. | 250/221 |
| 5,245,178 | 9/1993 | Elias | 250/221 |
| 5,302,942 | 4/1994 | Blau . | |
| 5,415,053 | 5/1995 | Elias | 73/865.7 |
| 5,490,081 | 2/1996 | Kuromoto et al. . | |
| 5,492,022 | 2/1996 | Elias | 73/865.7 |
| 5,515,266 | 5/1996 | Meyer | 364/184 |
| 5,559,664 | 9/1996 | Dogul et al. | 361/191 |

*Primary Examiner*—Emanuel Todd Voeltz
*Assistant Examiner*—Tuan Q. Dam
*Attorney, Agent, or Firm*—Chris A. Caseiro; Thomas L. Bohan

[57] ABSTRACT

A safety-related control system (SRCS) designed to safeguard personnel operating hazardous production equipment. The SRCS integrates the safety-related part of a machine into one homogenous system for the purpose of increasing safety. In so doing, the SRCS monitors the machine, the operator, and itself for safe operation. The SRCS utilizes a non-material barrier to sense the intrusion of a person's body into a hazardous area of a machine. The SRCS uses machine feedback and/or operator interface to determine whether a hazardous condition is present. If such condition is present, the hazard is rendered harmless by the time the intruding body member can reach the potential danger area. The system includes separable means for stopping motion of the moving parts of the equipment, starting movement of the movable parts, and detecting faults in sections of the system.

44 Claims, 12 Drawing Sheets

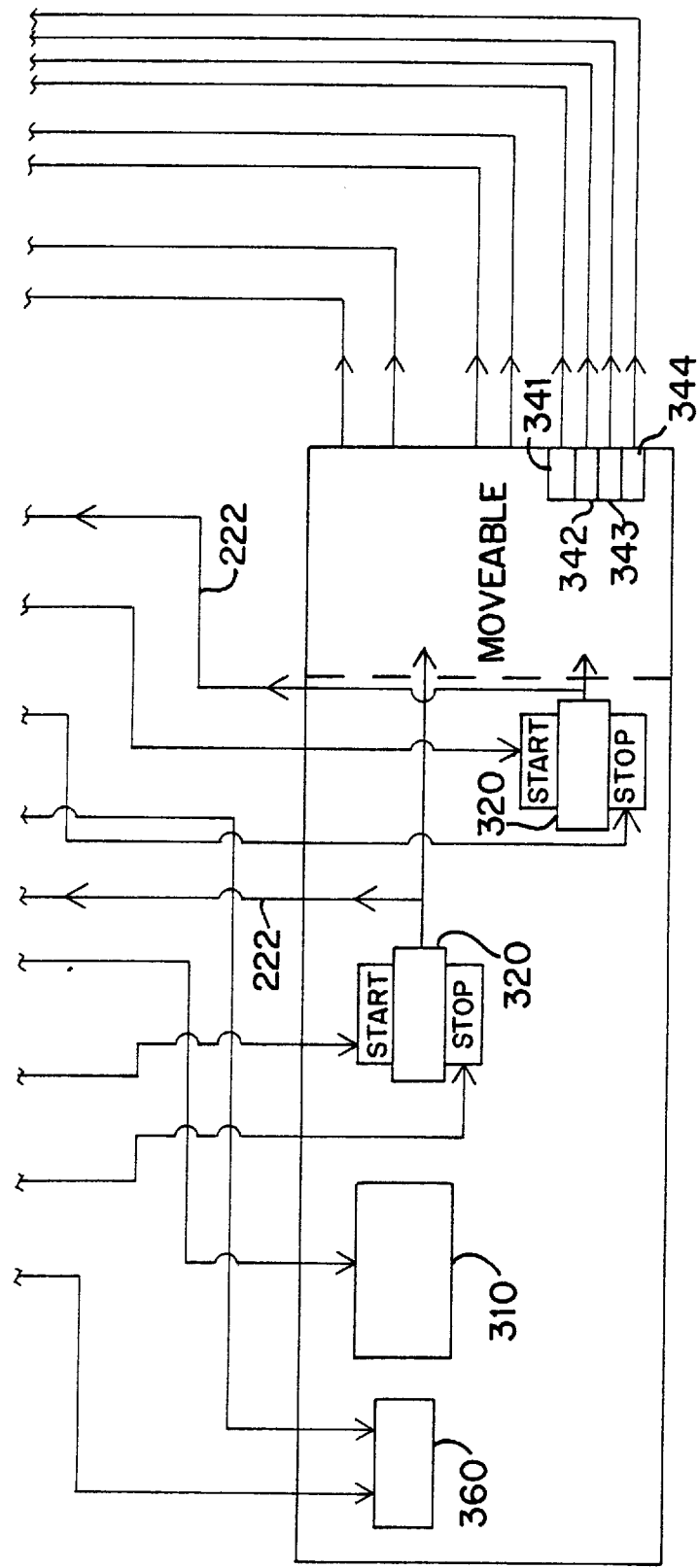

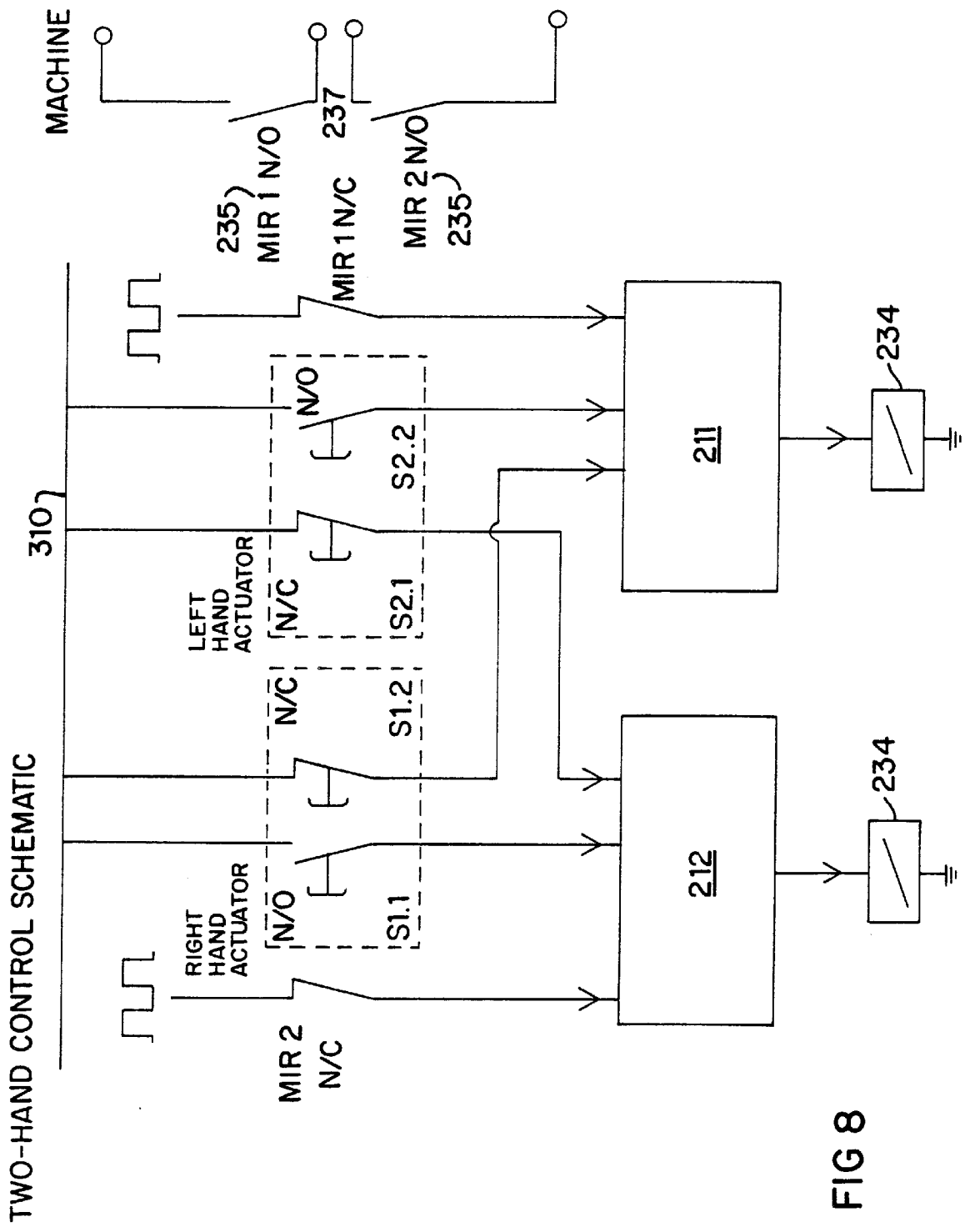

INTERFACE SELECTION BASED ON MODE OF OPERATION

| | MPCE FEEDBACK | SPM FEEDBACK | SSD | START/ RESTART INTERLOCK | POSITION SENSORS | TWO-HAND CONTROL DEVICE | MACHINE CYCLE TIMER | MACHINE INITIATION RELAYS (MIR) |
|---|---|---|---|---|---|---|---|---|
| Guard Mode | M | O/M | M | M | N/A | N/A | N/A | N/A |
| Automatic Mode | M | O/M | M | M | N/A | N/A | N/A | N/A |
| Mute Mode | M | O/M | M | M | M | N/A | M | N/A |
| Mute with Manual Machine Initiation Interface Mode | M | O/M | M | M | M | M | M | M |
| Guard with Manual Machine Initiation Interface Mode | M | O/M | M | M | M | M | N/A | M |
| Presence Sensing Machine Initiation Mode (PSDI) | M | O/M | M | M | M | M | M | M |

M = MANDATORY
N/A = NOT APPLICABLE
O/M = OPTIONAL OR MANDATORY DEPENDING ON THE APPLICATION

FIG 9

CONTINOUS REAL TIME SAFETY-RELATED CONTROL SYSTEM

BACKGROUND OF THE INVENTION

1. Technical Field

The present invention relates to improved safety of production equipment by integration of a machine's safety-related parts and safety-related control into one homogeneous safety-related control system (SRCS), where the machine, operator, and SRCS are continuously monitored and whereby any fault within the SRCS is discovered within the system's response time. More particularly, the present invention relates to a system of interrelated electrical, sensing, and mechanical modules designed and deployed to sense the intrusion of an object into a controlled space and upon such sensing to initiate a proper machine control signal, based on the event taking place at the machine. The machine signal is monitored to ensure that it achieved its intended safety function. Still more particularly, the present invention relates to an improved machine safety control that interfaces with 1) an electrosensitive sensing device, 2) safety mechanism initiation devices, 3) safety mechanism monitoring means, and 4) safety mechanism event control means.

2. Description of the Prior Art

Prior art views the machine safety system as an assemblage of component parts that together create a safety system. Standard devices used in such safety systems may include a two-hand control, an electro-sensitive protective device, a safety control, a protective light curtain, a motion monitor, a position monitor, a machine primary control element monitor, a machine control interface, a stop position monitor, or a brake monitor. Various combinations of these standard devices may be used in a given safety system. Each of these devices has a response time which is safety-critical in that it must fulfill its function in the stoppage of the press or other machine as a hand or other body part is rushing into a hazardous area. If even one device in the chain fails to respond within its proper time frame, the press will not stop in time to prevent injury. Most high-integrity devices of this nature have their response times monitored; however, because each is an independent stand-alone component, the response time can only be measured from the elapsed time that the component received its input to some specified time after its output was to occur. For fault-tolerant reasons, it is desirable to allow sufficient time, after the normal response time of the device, for monitoring the device's state. This additional time is to allow the mechanical parts of the output device or devices to come to a complete rest.

Furthermore, since most of these devices are monitored only for a complete failure to change state within an allotted time period, the actual response time of the device itself cannot be determined. For example, if a safety device with a normal response time of 5 mS is allocated 100 mS as its upper limit for determining a complete failure, then it can be difficult to determine the exact response time of that device. The actual response time could be 5 mS?, 25 mS?, 50 mS?, or 99 mS? There is no way to be sure. In an isolated incident, such ambiguity may not be all that safety-critical because of the margin-of-safety designed within the parameters of a particular employment of the device, however, such ambiguity would likely present various problems if allowed in a multiple safety device system.

A major problem occurs when individual components are linked in a chain of events and each component is monitored only for complete failure to change state. If there is no system for checking the actual overall response time of each event in the chain of events with respect to the start of the event (e.g. sensing function), the machine may accumulate response time error, and the component will validate its own output state at some elapsed time after its input signal. An individual component cannot detect whether its input signal was late and so it may erroneously validate its output signal at some extended period of time after it should have normally responded. Thus, the response time errors are allowed to accumulate. There is no opportunity to cure or detect that accumulation and so the overall stop time may become hazardously long.

Accumulative response time failures can occur in all of the following mechanisms:

1. Delay in code generation for polling light beam channels of a light curtain system.
2. Delay in light beam channel being polled.
3. Delay in sequencing to next light beam channel.
4. Delay in completing full scan of all light beam channels.
5. Delay in processing receiver signal.
6. Delay in transmitting output signal to relay coil of Output Signal Switching Device (OSSD).
7. Delay in OSSD energizing/de-energizing.
8. Delay in OSSD contacts opening/closing.
9. Elapsed time between OSSD input versus verification of OSSD output.
10. Delay in FSD's coil energizing/de-energizing.
11. Delay in FSD's contacts opening/closing.
12. Elapsed time between FSD's input versus verification of output.
13. Delay in Machine Primary Control Element's (MPCE's) energizing/de-energizing.
14. Delay in MPCE's movable opening/closing.
15. Elapsed time between MPCE's input versus verification of output.
16. Delay in Stop Performance Monitoring (SPM) output signal.
17. Delay in SPM processing.
18. Elapsed time between SPM input versus output calculation.

The electrosensitive protection device's change of state is the event which starts the chain of events to occur and should be the event in which all interim switch elements are clocked.

Typically, an electrosensitive protection device's signal processing circuit functions at a fixed "off"/"on" threshold level. The optical receiving elements, upon receiving a certain amount of radiation from their corresponding emitting elements, produce an illuminated "on" signal upon an object, such as a hand blocking a certain percentage of light, and the amplitude of the illuminated signal drops. Hopefully it drops to the "off" threshold level and the signal processing circuitry produces a machine stop signal.

The problem with this fixed "off" threshold level is that the amount of radiation needed to be removed from the receiving element is a function of the amplitude of the illuminated signal. For instance, a system with a fixed "off" threshold of 50 mV and an amplitude of an illuminated signal of 150 mV would require a blockage of radiation equivalent to 100 mV to reach its fixed "off" threshold. Conversely, the same system with an amplitude of an illuminated signal of 12 V would require blockage of radiation equivalent to 11.05 V to reach its fixed "off" threshold. For light curtain systems this radiation is generally produced by infrared light beams. In the first scenario, very little of the light beam had to be blocked to reach the "off" state. However, in the second scenario, the entire light beam needs to be obscured before reaching the "off" state. Assuming the beam diameters are the same size, it would require a much larger object to obscure all of the light beam in second scenario than in first scenario.

This problem is further exacerbated by the physics of the spectral relationship of light in which the beam spreads in a conical pattern over space. This results in two spin off problems. First, the beam diameter becomes larger as the distance between the emitter and receiver increases. Thus if the signal amplitude remains constant, the object size required to obscure the entire beam diameter increases, therefore the detection capabilities become application dependent, i.e. detection capabilities increase when distance increases. Second, the increased beam diameter can be reflected off nearby surfaces and rerouted to the receiver failing to detect the intruding object.

The problem is further exacerbated by the fact that photodetector elements are simple devices, they simply react to the presence or absence of light, thus other ambient light sources can create this rise in signal amplitude. Furthermore, ambient light is produced by various sources found in the common industrial workplace, i.e. sun, fluorescent lamps, halogen strobes, remote control devices, photoelectric devices and the like. This rise in signal amplitude will now require that enough of the normal system light plus the ambient light (which may be coming from a different direction) be obscured by the object in order to reach the fixed "off" threshold. This problem is even further exacerbated by systems that amplify their received light signal for transmission to the signal processing circuit. Such systems may amplify ambient light when the source is obscured, thus appearing as an unobstructed signal.

This problem is still further exacerbated if the photodetector circuitry is allowed to go into saturation, an event whereby the photodetector is being struck with so much light that it passes its entire supply current or voltage. The problem here is that no one knows how far into saturation the detector has gone, thus no one knows how much radiation is required to get it out of saturation nor how much reduction of radiation is required to drop the signal to its fixed "off" threshold. For example, saturation can be analogous to a water valve with the water being substituted for electricity (i.e. velocity and volume i.e. current and voltage i.e. PSI). The water valve may be half open at five turns, at which point, it passes all the water supplied to it. This is the valve's saturation level. One may continue turning the valve until it is fully opened, 10 turns, but no greater volume of water would flow. Someone else, who wanted to reduce the flow of water, would have no knowledge of how far they had to turn the valve before reaching the analog state of water flow.

Closed shorts between emitting devices and/or detecting devices in multichannel light curtain systems could result in detection capability loss. For instance, if a short was across adjacent LED emitters they could both turn on simultaneously, and as their light beams conically expand over space, each beam could be striking the intended detector. Similarly, if a short was across adjacent detectors, both detectors could produce an illuminated signal based on one LED emitter being on due to the conical expansion of the beam being large enough to cover both detectors. Either situation could endanger the operator, because an intrusion into the light array may go undetected.

The signal processing circuitry of a light curtain system may reliably detect an intrusion into its sensing zone, however, there is no assurance that its output circuitry has the ability to change state and thus achieve the desired result. The system must test itself to ensure that any intrusion results in an output state. For real-time continuous systems, this test must ensure that the response time of the output state is maintained.

Prior art demonstrates the use of redundant output devices which are monitored for a switching state using a method remote of the safety control system. The primary problem with this method is that the state of the output device is monitored without regard to the time it took to change its state in relationship to the event (i.e. blockage of light curtain) that commanded the change of state, thus the device may respond but may respond too late to prevent injury.

As a secondary problem, prior art devices rely on one of two output devices changing states. With the failure of one device, the other device performs the machine stop function, and the remote monitoring control prevents re-energization of the non-failing device thus resulting in a lockout condition. For a higher safety integrity system, "common cause failures" such as an electrical surge, burst, dip, etc., or an electromagnetic disturbance, EMI, RFI, ESD, etc., must be overcome.

Current stop performance monitors are used primarily on mechanical presses as a means to identify that the brake mechanism is wearing down and the machine no longer stops within its original requirements. Typically this is accomplished by initiating a stop command shortly before the press's ram has reached top of stroke, at which point, a signal is sent from the press's cam to initiate the brake and disengage the clutch. A second signal from the cam is then read to determine the cam's angular displacement. In the event this signal exceeds its parameters, and the ram has gone beyond top of stroke, an alarm is actuated. The problem with this verification method is that it does not monitor the response time of the switching elements in the chain of the real stop command, thus accumulated response time errors are not detected.

For cyclical machines that have a potentially hazardous half-cycle and virtually nonhazardous half-cycle (i.e. presses), it would be desirous to have the operator be able to reach into the machine during the nonhazardous time to extract parts. To achieve this objective, a light curtain must be bypassed (muted) during the nonhazardous half-cycle in order to not send a stop command to the machine's moving parts. This is potentially a very dangerous practice if in the event of malfunction the mute function was not turned off during the hazardous portion of the machine cycle and/or if the hazard/non-hazard portion of a machine cycle were reversed.

Prior art demonstrates how to achieve the muted state by using position sensors that interface with the machine's control system. Upon receiving a signal from the sensors, the control system energizes a bypass relay located in the current path of the light curtain's output devices so that during the nonhazardous half-cycle, a light curtain detecting an intrusion does not produce a stop output. However, the signal never reaches the MPCEs because the interposing bypass relay is rerouting the current flow to the MPCEs. The position sensors for presses are located at the top of the ram stroke and at the bottom of the ram stroke. The sensor at the bottom of the stroke initiates the muted condition and the one at the top of the stroke disengages the muted condition.

From the standpoint of high safety integrity this is a flawed system, one which uses single-channel techniques whereby any single failure of numerous devices could result in danger. For example, the interposing bypass relay used to keep the MPCE energized could fail in the "on" state, thereby removing the safety light curtain function during the hazardous half-cycle. The top sensor could also fail, thus not turning "off" the muted condition. The position sensors could be physically inverted, creating a bypass of the safety devices during the hazardous half-cycle. The machine control input signal from the position sensor could fail in a muted condition, and the machine's output signal could fail in a muted condition resulting in a similar danger to the operator.

Typically, the start actuator of a machine is a simple "on"/"off" switch, which when manually placed in the "on" position remains there until manually switched to the "off" position. From the standpoint of safety, this type of switch configuration is flawed. For example, in the event of power interruption of the source, the machine would automatically stop, and when the source power is restored, the machine will be put in motion. This situation is very dangerous for an operator or maintenance person who may be troubleshooting the cause of shut down in the hazard area. This type of switch configuration is further flawed by the fact that the switch is not interactive with the safety control system. The safety system cannot effect it upon system failure. This configuration is still further flawed in the event the machine system has a bypass, i.e. mute, which may bypass the safety system based on de-energizing one or more relays.

Typically, two-hand control devices are stand alone safety devices that when actuated initiate machine motion. Typically these devices have a circuit to ensure neither actuator is fastened down (thus allowing for single-hand control) and that they both are actuated within a specified time of each other. These devices must be kept depressed during the hazardous cycle (i.e. downward stroke of the machine). Failure to keep both actuators depressed will result in machine stoppage. This system is flawed in the respect that many failures can occur which would jeopardize safety integrity, such as the commingling of safety lines in which one-hand control produces both signals due to cross interference.

Presence-sensing Device Initiation (PSDI) is a method of initiation of the machine cycle upon interruption and restoration of the light curtain's sensing zone. During the non-hazardous portion of the machine cycle, the operator reaches into the machine's hazard area to remove the product thereby creating an interruption and restoration of the sensing zone of the light curtain. PSDI functions in either a single break mode (as described above) or a double break mode in which the operator enters and leaves the detection zone twice (removing the finished product and inserting new material).

This mode of operation can be extremely dangerous because the sensing function of the light curtain is governing the machine initiation, not the operator. In the event of malfunction of the light curtain, interfacing control system, machine position sensors, machine feedback signals, or any of the above response times, the machine could initialize a cycle suddenly and abruptly.

The prior art has addressed this mode of operation primarily by way of avoidance. In the isolated cases in which it has been implemented, the onus of safety has been put on the machine installer via programming the machine control's PLC (Programmable Logic Control). This is flawed in the respect that the PLC is not a safety control. The PLC does not have a physical structure of redundancy and comparison, and thus failures go undetected. This mode of operation is further flawed in that it assumes the programmer is familiar with the safety techniques and measures needed to ensure high level safety integrity of the software and how to implement software tests.

There are six basic modes of operations in which light curtain systems interface with the machine based on how the operator is to interact with the machine. Establishing a functional interrelationship of the safety-related parts with the other functional parts of the machine has traditionally been done by interfacing the safety-related parts with the machine control. In this solution, the safety systems default their safety-related integrity to the machine control (i.e. PLC). From the standpoint of high-level safety integrity this method is flawed. The PLC is not structured with two-channels where each channel performs its safety-related function independent of the other by comparing its result with the other and any disparity resulting in a lockout. In addition, the machine control has no knowledge of the start of the event (i.e. last unblocked light curtain scan). Therefore it has no way to verify accumulated response time errors. Also, because the machine control is programmed in the field, the program must reside in Random Access Memory (RAM). RAM is susceptible to alteration and is recommended for limited use. Where RAM is used in a high safety integrity computer system, the system must have two-channels, and each channel must assure it performs RAM checks to ensure bit corruption has not occurred. In addition, the ability to program software in a structured high safety integrity manner is not what one could reasonably assume would be found in the workplace.

Traditional safety devices were constructed by interfacing discreet safety-related parts to a machine controller. The user settings were a programmed-in function by the user. As discussed above, this method fails to ensure high safety integrity.

Therefore, what is needed is a system that measures each device's response time in relation to the start of the event (the beginning of a new scan cycle of the detection device following a scan that detected no hand or other interruption in the hazard or sensing field). By measuring the elapsed time of each component in the chain of events from the start of the scan cycle, each component's response time can be validated and the accumulation of slow response times monitored.

What is also needed is an intelligent light curtain system that can "learn" its environmental surroundings and setup parameters (i.e. its own signal strength) and can adjust itself as necessary. In addition, what is needed is for the intelligent system to recognize its own light source and distinguish it from other spurious bursts of radiation. What is further needed is for the system to not allow its detection device to go into saturation. Still further, what is needed is that the safety integrity of the learning process be maintained throughout the system.

In order to overcome the response time monitoring problem of accumulation error, what is needed is a homogeneous system that incorporates the light curtain function and the safety-related control function, whereby the output response time of each device in the stop chain of command is clocked from the last unblocked scan of the light curtain. Further, the monitoring must be performed within milliseconds of when the device was to change state in order to provide a secondary method of machine stoppage in the event of failure to respond. To overcome problems associated with common failures of similar devices, an additional, dissimilar switching device in an unrelated current path is required.

For high integrity safety-related control systems, it is not enough to simply ensure that it produced an output. What is needed in this safety system is to ensure that the proper output is realized. The safety-related control system must monitor for the safe state of the machine. If that state is not realized within a specified time of response, the safety-related control system must be able to produce a secondary output to protect the operator. Each element in the stop chain of command must be monitored for its timely change of state in relationship to the last unblocked scan of the light curtain system.

Prior stop performance monitors are flawed in the fact that they do not take into account all of the events in the stop chain of command. SPMs disregard all interposing devices which may respond sluggishly such as the light curtain, the OSSD, the FSDs, the MPCEs, etc. SPMs do not monitor the true stopping time of the machine as it relates to safety of the operator reaching through the light curtain's sensing field into a hazardous machine area. These SPMs are also limited to monitoring only one type of machine (i.e. clutch/brake type). What is needed is a means to determine machine motion and to equate the amount of elapsed time from blockage of the light curtain to the cessation of motion.

What is needed is a homogeneous safety control system with two-channel structure and dynamic signal processing. The system must know when the muted condition is to occur and recognize fault conditions in the process. The system must also detect any misapplication or physical alteration of the position sensors. The system must inform the operator of a muted condition, must not bypass necessary safety mechanisms, and must maintain stop control in the event of a malfunction. The system must also verify that the mute signals are functioning properly prior to allowing the mute condition to occur. All of this must be done without compromising operator safety.

What is needed is a safety start actuator that requires a deliberate act by the operator to enable the machine to be put in motion. After power restoration, the actuator must create a lock-out upon power interruption. The actuator must be an integral part of the SRCS and must be monitored to ensure that a failed "on" state cannot exist. In addition, the actuator, or another actuator, must perform a restart enable function. What is further needed is an indicator to inform the operator of the reason for the machine stoppage.

What is also required for high safety integrity are means to initiate machine motion in a safe manner and ensure that machine motion cannot occur until the hazard zone is vacated of personnel. Although the prior art is satisfactory for some applications, it does not satisfy the requirements for high safety integrity needs. What is needed is a two-channel technique with comparison and dynamic monitoring. The two-channel technique must include two signals from each actuator (i.e. 4 signals which are processed by two independent signal processors and compared). Each signal processor must independently control a machine motion initiation device. All switch contacts must be monitored dynamically for their off/on/off states, and signal processors must compare the results. Systematic failure must result in a lockout state which is only recoverable by qualified personnel.

Since the two-hand control must be kept depressed for the entire downstroke of the press, a safety means must be incorporated to ensure that the two-hand control "knows" the position of the press' ram. A single-channel means could fail in the "closed position" and could falsely indicate a ram at the bottom state. Even two such devices could produce a dangerous condition by one device failing in such a state and then the other at some future time. What is needed is for the ram-position devices to be two-channel with a comparison check and verified on a dynamic basis. There is a need to know when the ram is at the top of its stroke to validate the initialization of the next stroke, and such validation must correspond with predetermined time parameters. In addition, what is needed is that the position sensors be validated for their ability to change state prior to relying on them to determine the location of the ram without jeopardizing operator safety.

The SRCS must verify that its motion initiation devices are operating properly. Failure of the two-hand control's actuators, restart enable actuators, start enable actuators, output devices, control, etc., and/or failure of the position sensors, and/or the interfacing control (i.e. machine control) must be detected by a homogenous safety system and must result in a lockout condition. When any one of these failures is detected, all safety device outputs must go to the "off" state to stop the machine motion. It is insufficient for high integrity safety systems to merely have the two-hand control's output remain "off" especially when it is a single-channel output.

What is needed is to incorporate all the system components (i.e. light curtain components, machine feedbacks, position sensors, machine initiation devices, mute operations) into a single homogenous SRCS. The SRCS must have two-channel structure with comparison, high-level safety integrity software, and must monitor interfacing elements for their respective states and response times as pertaining to the light curtain scan.

What is needed is a single homogenous SRCS with field-selectable modes of operation that require no field software programming to perform their desired functional manner of man/machine interface. What is further needed is an SRCS of two-channel structure with comparison and dynamic monitoring capabilities, programmed-implementing structure software, and a self-test of that software.

Finally, what is needed is a homogenous SRCS that requires no user program, but has user-selectable means that are automatically verified and tested by the SRCS after originally having been validated by the installer subsequent to proper selection at commissioning.

SUMMARY OF THE INVENTION

To avoid the safety breach created by accumulated response time errors, the safety-related components of the system must be integrated into a homogenous SRCS, whereby all events in the stop command chain of events can be measured from the event which starts the chain of events in motion or stoppage. The safety-related components include all parts that control (i.e., initiate, stop, monitor, evaluate, etc) machine motion, set-up the machine operation parameters, or communicate operational mode information. Each safety-related part must be verified for its ability to perform its intended function. Also, since this is a real time, continuous safety system, all verification of internal system parts must be carried out within the specific response time of the SRCS (i.e., about 30 mS). All external parts must be verified within a specific response time of the specific device, as clocked from an event start. Internal fault detection means includes a check of hardware, software, and system errors. Internal fault detection is performed concurrently with machine monitoring means and operator monitoring means while sensing function signal processing means is occurring simultaneously. Because this is a continuous system, there is no off-line time to perform such verification, thus all processing of fault detection is interlaced with functional processing.

The SRCS system maintains its detection capabilities regardless of signal amplitude by "learning" its setup parameters and environmental conditions. This is accomplished after the system has been setup and during its "Pre-Run Phase." During the Pre-Run Phase, the system polls each of its receiving elements with its corresponding emitting element "on" and records its signal amplitude. Sufficient samples are taken and then averaged to establish an average value (i.e. the floating reference point). From this floating reference point, upper and lower "off" threshold values are established.

The value from the upper "off" threshold to the lower "off" threshold represents the amount of light flux radiation that will be removed by a specified size object. The signal amplitude can now float within this band which will occur due to changing ambient light conditions such as sunlight, florescent lights, reflections, etc., and detection of the intruding object is ensured. For example, a ½" object is known to reduce the light flux radiation by 0.50 V regardless of the light flux energy (i.e. signal amplitude). After the Pre-Run Phase, the average signal amplitude is 5.0 V. An upper threshold of 5.25 V and a lower threshold of 4.75 V is then established. The signal amplitude can now float within the band of 4.749 V–5.249 V and detection of a ½" or larger object will be assured.

The system also has a hard program upper and lower "off" threshold whereby the upper value is set just below the supply voltage/current value thereby not allowing the detector(s) to go into saturation. The lower value is set at a minimum value thereby not allowing the system to calculate a negative "off" reference point. This successfully traverses the problems associated with 1) a high amplitude system generated signal (i.e. close distance installed), 2) a system's additional light due to reflected light signals, and 3) ambient light that is constantly present and varying. However, it does not address the problem of spurious bursts of light from devices such as photoelectric devices and infrared remote controls which may be pulsating at similar rates of speed.

To address this problem, the system creates a light pattern signature whereby it creates a double pulse of its emitted light for each channel (emitter/receiver) of the curtain. The detector is polled four times. The first polling occurs prior to the first light pulse. This reading must be equal to or below the hard program lower threshold (i.e. no ambient light pulse). The second polling occurs after the detector is fully illuminated. This reading must be within the learn mode band (i.e. upper and lower calculated threshold). If it exceeds the upper threshold it is an ambient light pulse. If it is below the lower threshold it is an intruding object (i.e. hand). After the emitter is turned off and while the detector signal is decaying, the detector signal is polled for a third time. This reading must be within a percentage of the value of the illuminated reading. A higher reading than anticipated means there is an ambient light pulse. The final polling occurs as the emitter is turned back on. The signal should be within the illuminated band area. A higher signal means a pulse is present, and a lower signal means there is an intrusion. This polling process creates a light signature using all four off threshold levels and assures that ambient light pulses are not negatively interfering with the systems' generated light. This entire sequence takes places in a 200 $\mu$S time frame and occurs for each channel of the light curtain every time it is selected.

Since this system operates on a fixed frequency between the two turn-on levels of the emitter, it is possible that another infrared device, pulsating at the same frequency and striking the system's detector element(s) from an angle, could interfere with the detection process by going around an intruding object. If this ambient light pulse was present at the time the system performed its "learn" process, the system would sum the two values and establish references from that point. This would result in a misleading reference point. The system could not then guarantee that the removal of the system's light would be sufficient to drop the signal to the "off" threshold. To avoid this potential problem, the samples are taken on a fixed frequency during the "learn" mode, and the frequency is varied by 5 $\mu$S between channels during the detection mode. Therefore, if the signal reference points were learned erroneously (e.g. with ambient light pulses), the signal range levels would be calculated at a higher level upon removing the ambient light due to shift in frequency, the signal amplitude level would decrease and thus require that less light be removed in order to reach its "off" threshold value. This process requires using the actual analog signal of the detector device in order to achieve its results. This signal is transmitted to the analog to digital (A/D) processor of the microcontroller for comparison to its learned value.

Since the A/D conversion is safety critical for the detection capabilities it must be tested to ensure it is properly converting. This is achieved by creating a known analog value which is periodically put on the analog input port of the microcontroller. The digitized results are then compared against a known reference value. Since the actual analog detector signal could be near anything from 0.0 V to the supply voltage/current, the entire range of the A/D convertor could be used. Thus, the entire range of the A/D must be tested at increments of the "least significant bit." This is a time consuming process for a "real-time system," thus "dynamic memory parcel time checks" were developed whereby the range of values are parcelled off and put in a memory class. At the end of each scan cycle, the microcontroller selects a memory class and tests only a small portion of the A/D range. Upon the next scan, another memory class is selected. This continues until all memory classes have been tested, and then the process repeats itself.

The system traverses potential shorting problems by performing automatic self-tests of shorts between adjacent emitters and detectors. The tests are performed after the light source signature test. Thus, if no blockage is detected, the system turns on its emitter and then polls its corresponding detector. To make sure it has an illuminated signal, the system removes the supply from all the other emitters, and upon a positive response, it then polls all the other detectors to see if any of them show a shorted state. The detector shorts test and the emitter shorts test occur simultaneously in a like manner.

The emitter/receivers are set up in groups of 16 channels. In the first test, all 15 remaining channels are tested for a short to the first channel. In the second test, 14 channels are tested for a short to the second channel (i.e. shorts between channels 1 & 2 were just tested). In the third test, 13 channels are tested for a short to the third channel, and so on until all channels have been tested for shorts to each other. Each set of shorts tests are conducted after the channel has been polled for its detection function and no blockage is detected. Since the number of channels to test for shorts decreases as the number of polled channels increases, the scan cycle is shortened, which causes a varying scan time per channel.

To assure a light curtain can detect the darkened state of each of its channels, process the signal properly, and produce its output within the specified response time, the system incorporates a "Complete System Integrity Check." For this check, during each complete cycle through all the channels of the light curtain, the system selects a particular channel to perform a blockage test and processes that signal all the way through to de-energization of its output devices. This de-energization signal is verified by the control circuitry. Both microcontrollers process the blocked signal, and each produces its own de-energization signal. Verification of processor "A" deactivation of the output device is performed by processor "B" and vice versa. Upon successful verification, the output device is rapidly re-energized, whereby the de-energization of the output device is transparent to the controlled machine. The entire de-energization/re-energization event of the Output Signal Switching Device (OSSD) consumes only microseconds. This test validates the system's ability to recognize a darkened signal, process that signal, produce an output signal, and the ability of the output device's solenoid (i.e. relay coil) to change its state. This test ensures that the system can produce an output within its specified response time and is performed after each full scan of the light curtain. Upon completion of this test, the entire plurality of channels are scanned in their detection mode. Upon completion of that scan, the Complete System Integrity Test is repeated on another channel. This continues in a sequential pattern until all channels have been tested, and then the entire process repeats itself.

The system incorporates the light curtain system and the safety control system into the single homogeneous SRCS. In the SRCS, all events are measured from the unblocked scan of the light curtain system. The output devices of the light curtain system are comprised of two safety relays for the final switching devices (FSDs) and another safety relay for a secondary switching devices (SSDs) method. The FSDs interface with the machine's primary control elements (MPCEs). The secondary switching device(s) (SSDs(s)) interface to the machine's secondary control elements (MSCEs, i.e. machine main supply, etc). The FSDs and SSDs are dissimilar safety relays and are associated with unrelated parts of the machine.

The "off" state of each device is monitored prior to energizing to the "on" state. Upon energizing, the "on" state is monitored. Thereafter, the "off"/"on" states are monitored upon each change of state. Upon failure of one FSD, the other FSD will go to or remain in the de-energized state, and the SSDs will go to or remain in the de-energized state. Upon failure of both FSDs, the SSDs will go to or remain in the de-energized state. Upon failure of the SSDs, the FSDS will go to or remain in the de-energized state. The FSDs and SSDs will also go to the "off" state upon failure of any of the automatic self-verification tests, machine monitoring devices, machine actuation devices, actuation enable devices, or any of the safety critical operator warning devices. The SSDs coil is tested for its ability to de-energize upon each performance of the Complete System Integrity Check.

The system checks its ability to detect a darkened signal and produce an output of its output signal switching devices (OSSDs) upon each full scan of its light curtain. This signal is timed to within a microsecond. In the event of an intrusion into the light curtain, the OSSDs command the open state of the FSD's control contacts, which contacts initiate the machine stop command. The machine control contact is mechanically fastened but electrically isolated to a monitor contact. As the control contact opens, the monitor contact closes. The monitor contacts are verified for a closed state within milliseconds of when they were to have responded. If any of the four monitoring contacts fail to reach the closed-state within the specified time, the system, within a few milliseconds, goes into a lockout state which will not allow the FSDs to re-energize and will de-energize the SSDs to remove power to the primary mover.

As the FSDs properly transmit their output signals to the Machine Primary Control Elements (MPCEs), the safety-related control system monitors for each MPCE's stop state. This stop state must occur on or before the specified time in which the they were to respond. If this stopped state is not realized within this time frame, the system will go to its lockout state. The SRCS knows the required response time since the SRCS has been set by the installer as to when the response should occur. The required response time of these devices is a function of the speed in which the machine can stop once these devices change state and the distance the light curtain is placed from the hazard area. Since the SRCS is homogeneous, it can calculate the amount of elapsed time from the start of the event to the stop state of the MPCEs and compare this to the time programmed into the SRCS by the installer.

The system achieves true stop performance monitoring by being a homogenous system since it calculates the elapsed time from blockage of the light curtain to the cessation of machine motion. If the cessation of motion is not achieved within the preset time, programmed by installer, a lockout condition is immediately initiated.

The SRCS implements two encoders to detect motion. Each encoder produces two optical signals which are in inverted states for each increment of movement. Thus for each incremental movement, the SRCS receives a logic 1 (illuminated state) and a logic 0 (darkened state) for each encoder. The failure mode and/or the disconnection of the motion detector can now be determined. The disconnection of the encoder will now appear as two darkened signals, just as if one or both of the signals got stuck in the logic 0 state. If one or both of the optical signals got stuck in the logic 1 state, the system would recognize the non-inverted state as a failure. If one optical signal got stuck in the logic 1 position and the other optical signal got stuck in the logic 0 position, the SRCS would erroneously recognize this as a stopped state of the machine. This is the reason for having two motion detectors. The encoder functions by rotation of an optical disk in front of optical sensors and can easily be adapted to rotationally moving parts of a machine. It can be further adapted to linearly-moving parts, such as hydraulic- or pneumatic-powered parts, by creating the rotational movement via linear movement. If the two encoders are improperly attached to the machine such that their optical discs did not rotate, the state indicated would always be a stopped state, i.e., a logic high and a logic low from each encoder. Therefore, the pulses transmitted during motion are delivered to a free-flowing counter. This counter is verified for counts upon the homogeneous SRCS receiving input from the position sensors indicating that the machine changed position.

The Safety Control System integrates the light curtain system, the mute signal devices, the operator indicator signals, and the machine actuating devices into one homogeneous SRCS. The system utilizes two-channel signal processing with comparison to validate input signals. These signals are dynamic. Four position sensors are used to determine the position of the ram, two at the top and two at the bottom. The top sensors are located at the near top and dead top positions, while the bottom sensors are located at the near bottom and dead bottom positions. Activation of the position sensor is represented by a logic high and deactivation by a logic low. When polling the sensors, all four sensors are read, and those readings represent a four-bit binary code. The four-bit binary code helps the system determine eight positions of the ram cycle (i.e. top, downward near top, downward between near top and near bottom, downward near bottom, bottom, upward near bottom, upward between near bottom and near top, upward near top). By knowing the eight positions of the ram cycle, the system can determine a proper sequential order of the four-bit binary code for each of the eight positions. An out of sequence or wrong sequence immediately results in lockout, indicating a failure of a position sensor or improperly installed sensor (e.g. bottom sensor at top, wire terminal mix up, electrical disturbance between sensors, damaged cables, etc). At the top of the stroke (mute disengage), both near top and top position sensors are in a logic high state and similarly at the bottom of the stroke (mute activate) thus the system has redundancy of these critical functions.

The system employs both sequential signal monitoring and redundancy to ensure the safety of the mute function. In addition, the system mandates the operator to perform a cycle test of the system prior to allowing the mute function to occur. This is achieved by forcing the operator to apply a "Dummy Cycle" of the machine when the machine is first powered up. This is a sub routine within the system's program that must be done, otherwise the system will not allow the machine to enter the Run Mode. To implement the "Dummy Cycle," the operator must initiate the machine cycle by way of the two-hand control device. Both actuators of the device must be kept depressed for the entire cycle of the machine. This ensures that the operator's hands are not in the hazard zone prior to the position sensors being validated as to proper functioning and proper sequential order. Should the operator release either actuator prior to completion of the cycle, the SRCS will immediately go into lockout (i.e. "Restart Interlock").

To recover from the "restart interlock," the operator must depress the "restart actuator." At that point, the system will recognize that the ram is not at the top of the stroke (i.e. lockout occurred prior to completing a full cycle) and the system will enter another subroutine of its program called "Jog Mode." In Jog Mode, the operator is required to depress the two-hand control which actuates the ram to the top of the stroke. The operator is then required to successfully repeat the "Dummy Cycle." Upon successful completion, the system will enter its "Run Mode" of operation and this test will not be repeated until the next power up or lockout.

To ensure the position sensors are not altered due to personnel working on the machine or otherwise, the system has a hard-programmed cycle timer that requires the machine to cycle within a preset time. If there are no cycles, the timer runs out and the system enters a "Restart Lockout" requiring a "dummy cycle" upon re-initiation. As a safety precaution the system informs the operator via a warning light that the mute condition is active. This light is tested to ensure its ability to function for each on/off state.

As an additional safety precaution, the terminal connections for the position sensors are equipped with indicator lights that illuminate upon mating of the position sensor's cable. The terminal is marked as to which position sensor is required in order to facilitate proper installment of the sensors.

The system incorporates a start/restart actuator as part of its homogeneous safety system wherein an operator-induced error, a power-up, a power interrupt, or a machine cycle timer that has timed-out, causes the system to enter a lockout state, which the operator can only recover from by initializing the start/restart actuator. The system must validate the dynamic state of off/on/off of the actuator contacts. This ensures that both contacts (i.e. redundant safety measure) are in the "off" state and will not allow machine motion at power interrupt. Two switch contacts are read by both microprocessors and compared for disparity. A yellow warning light illuminates, near the switch, as the safety system enters the start/restart lockout state. This light is tested for its ability to illuminate and turn off upon each occurrence.

The system incorporates two-hand control actuators as an integral part of the homogeneous SRCS, whereby the SRCS 1) knows whether the machine has been first powered up and has produced a start lock-out state and monitors for a start enable state, 2) produces the requirement for a dummy cycle, 3) produces a re-start lock-out state and monitors for re-start enable state, 4) monitors the machine's movable parts for positioning, 5) produces the requirement for a dummy cycle and jog mode, if necessary, 6) processes the two-hand actuators on a two-channel basis (i.e., dual processors), 7) processes the two-hand actuators' contacts in a dynamic two-channel means with cross monitoring, 8) processes the two-hand actuator on a temporal means, 9) processes the machine initiation relay's (MIR) output signal on a two-channel means with monitoring, 10) validates the ability of the MIRs to go to the on/off states, 11) produces a restart lockout upon operator induced errors, and 12) produces a permanent lockout condition upon any component or software failure.

The SRCS verifies the position of the machine's movable parts by way of four position sensors. The position sensors are validated using redundant sensors with two-channel processing with comparison, plus by sequential pattern monitoring with two-channel processing with comparison.

The SRCS verifies the actuation of the two-hand control actuators by way of monitoring the position of the four contact positions of the actuators (i.e. two contacts from the left-hand actuator, two contacts from the right-hand actuator). The normally-closed (N/C) contact from the left actuator and the normally-open (N/O) contact from the right actuator are monitored by microprocessor "A" while the N/C contact from the right actuator and the N/O contact from the left actuator are monitored by microprocessor "B," which can be the other of the two microcontroller types. The actuators are "cross monitored" by each processor and compared (i.e. two-channel processing). The contacts are monitored for the dynamic states of off/on/off. The processors verify actuation of the left and right actuators on a temporal basis, in which the "off" to "on" state of each actuator must be within a half second of each other.

The machine initiation relays (MIRs) are internal to the SRCS. The MIRs are safety relays with a N/O machine control contact and a N/C monitoring contact, that are mechanically linked and electrically isolated. The open state of the control contact is verified by the closed state of the monitor contact and vice versa. The MIRs are checked for each change of state. Microprocessor A checks MIR 1 and microprocessor B checks MIR 2 and both compare their results. Microprocessor A controls the energization/de-energization of MIR 2, while microprocessor B controls the same for MIR 1. Thus, the MIRs are cross-monitored by the two-channel process and compared within milliseconds of when they were to change state.

Operator induced errors (release of one or both of the two-hand control actuators prior to the machine's ram or movable part reaching the bottom of the stroke, both actuators not being depressed within ½ second of each other, etc.), results in a "Restart Lockout" where the MIRs are deactivated and the SRCS's FSDs go to the stop state. The SRCS also removes itself from its "Run Mode" of operation and enters a "Restart" sub-routine which requires the operator to actuate the Start/Restart Actuator to reenter the "Run Mode." Upon reentering the "Run Mode," the SRCS "knows" the machine's ram is not at the top of the stroke via polling of position sensors and enters its Jog Mode sub-routine to allow machine movement to the top of the stroke. As the operator jogs the machine's ram to the top of the stroke, the SRCS enters the "Dummy Cycle" sub-routine to verify the position sensors. This requires that the operator keep the two-hand control actuators actuated for the entire machine cycle. Upon successfully completing this test, the SRCS reenters its "Restart" sub-routine, which requires the operator to re-initialize the Start/Restart Actuator. Via polling the position sensors, the SRCS then "realizes" the machine's movable part is at the top of the stroke and enters the "Run Mode" of operation.

Systematic failures such as any component's inability to change state or oscillations and any software failure whereby improper registers are read or bits changed, etc., result in a permanent lockout. A permanent lockout is not recoverable by the operator, because the SRCS enters its "Initialization Phase" which requires a qualified person to enter the SRCS's locked enclosure and repair the system to revalidate the system via a key interlock.

Operator misuse of two-hand control actuators (e.g. actuating both actuators via one operator action such as with a stick or with an elbow and hand of the same appendage) are prevented by physically shielding the actuator buttons in a way that prevents that option.

The Machine Initiation Relays (MIRS) are an integral part of the SRCS because they interface with all Run Modes of operation, which require a two-hand control device and the Run Mode of operation of Presence-sensing Device Initiation (PSDI). Since the MIRs are an integral part of the SRCS, there is no external circuitry within the two-hand control devices. This avoids failures associated with the integration of the control circuits which are normally caused by environmental influences (e.g. electro-magnetic emissions, electrostatic discharge, radio frequency interference, electro-magnetic interference, heat fluids, corrosives, etc).

The system incorporates all parts of the safety system, required for PSDI, into one homogeneous SRCS with two-channel structure and comparison. All interfacing elements and internal elements are monitored for their ability to change state within their required response times as it pertains to the start of the light curtain scan. The system incorporates high level safety integrity software which is structured in a manner to permit "external" testing as well as self-testing of its own software. In addition, the system only requires the installer to select the PSDI mode of operation, via a switch, to interface the required parts to the system. In the event the interfacing parts are not installed or installed erroneously, the system will not permit the entering of the Run mode of operation. The output signals of the PSDI mode of operation come from two MIRs, two FSDs, two SSDs, and an Auxiliary output. The input signals of the PSDI mode of operation come from four position sensors, two MPCEs, two SPMs, a Start/Restart input, and four two-hand control inputs.

The two-hand control device is required for the first cycle of the machine after power-up and upon restart lockout. It ensures that an operator's hands are not in the machine hazard area prior to validating the proper functioning and sequence of the position sensors, which require machine motion to test (i.e. Dummy Cycle). It also provides a means for the operator to jog the machine to the top of the stroke in the event of a restart lockout.

The auxiliary signal output interfaces with the machine control system to inform it of an interrupt of the safety system, whereby the machine control program can keep in synchronization with the events caused by the SRCS. In addition the SRCS has a cycle timer to ensure that repeated machine cycles occur within a set time period. If the machine is not cycled within this time frame, the timer times out and the SRCS goes into a restart lockout, requiring the activation of the restart actuator and the execution of the "Dummy Cycle" via the two-hand control. This ensures that if the operator leaves the machine, someone else cannot inadvertently create a machine cycle by interruption of the light curtain.

As the PSDI function is being performed (i.e. the machine is in the nonhazardous portion of its cycle and the light curtain is in the muted condition), the light curtain scans its sensing zone to determine the interruption/restoration of the zone. Unlike during stop detection in which the darkened state is decided on within microseconds, this darkened state (interruption) must be present for a predetermined time, and also the illuminated state must be present for a predetermined time before the determination of a single break or double break is made. This time period is based on the normal time it would take for an operator to reach through the sensing zone and place an object at a reasonable distance behind the sensing zone then retreat back out of the sensing zone. This time requirement is to prevent fast-flying objects (e.g. flying insects, ejected parts, oil splash, etc.) or very thin products from erroneously triggering the interruption/restoration requirement of PSDI and thus resulting in a machine cycle.

Software checks for real-time continuous systems that have no off-line time are difficult to achieve due to the amount of time that the software checks consume. To test the entire software for bit coupling, bit toggling, corruption, etc., on a system such as this could consume up to five seconds. This consumes too much time for an SRCS that must respond and perform all automatic self-tests within 25 mS, and since the safety function is continuous, there is no off-line time to perform such software checks. To overcome this problem, "dynamic memory time checks" were developed whereby parcels of memory are verified in small increments of time and yet the entire memory is verified within the overall allotted time.

Diverse software is used for each microcontroller in order to ensure that systematic errors of omission, thought process, programming, etc., are not common to both microcontrollers.

To ensure the system program cannot be altered by electrical disturbances induced via its interfacing devices (e.g. cables), the system has opto-isolated terminal connections whereby the interfacing devices input signal is converted to an optical signal which in turn is reconverted into an electrical signal for interfacing to the microcontroller's ports. Hence, the electrical disturbances from the outside world are isolated from the control system.

At first commissioning, the system requires the installer to set up its parameters of operation by positioning a variety of switches and timers to a desired setting. The system has four phases of operation including Initialization, Pre-Run, Run, and Lockout phases.

The Initialization Phase is the only phase in which the setup parameters can be set, because this is the only phase in which the user-selectable settings are polled by the microcontrollers. To enter this phase the "Phase Selection Switch" must be positioned to "Initialization" and the unit must be powered-down and then powered-up. To exit this phase, the "Phase Selector Switch" must be positioned to the Pre-Run Position and the key-validation switch activated.

The Pre-Run Phase is the phase wherein the SRCS performs all of its automatic self-tests prior to allowing the machine to function. To enter this phase, the "Phase Selection Switch" must be positioned at the Pre-Run position. In future power-down/power-ups, this phase is also executed whether the Phase Selection Switch is in Pre-Run or Run Phase. To exit the Pre-Run Phase, the Phase Selector Switch must be positioned at the Run Position.

The Run Phase is the phase wherein the SRCS allows machine motion and performs its safety function inclusive of all safety monitoring and automatic self-tests. There are six modes of operation in the Run Phase including Guard, Automatic, Mute, Mute with Manual Machine Initiation Interface, Guard with Manual Machine Initiation Interface, and Presence-sensing Device Initiation (PSDI) Modes.

Within the "Guard Mode," the SRCS's FSDs follow the interruption/restoration of the sensing zone (i.e. FSDs de-energize upon interruption and energize upon restoration of the sensing zone).

During the "Automatic Mode," the SRCS's FSDs follow the interruption of the sensing zone and a restart lockout occurs. To re-energize the FSDs, restoration of the sensing zone must occur and the restart actuator must be actuated.

The Mute mode is similar to the Automatic Mode, except during the nonhazardous portion of the machine cycle, the light curtain system does not generate a stop motion of its FSDs. The machine cycle is initiated by a device external to the SRCS.

The Mute Mode with Manual Machine Initiation is similar to the Mute Mode, except the two-hand control device for initiating a machine cycle is integral to the SRCS.

The Guard Mode with manual Machine Initiation is similar to the Mute Mode with Manual Machine Initiation, except the light curtain is not muted during any part of the machine cycle.

The PSDI Mode is similar to Mute with Manual Machine Initiation except Machine Cycle Initiation is done by interruption and restoration of the sensing zone during the nonhazardous portion of cycle.

The Lockout Phase can be entered from any phase and results from any fault condition within the SRCS. To recover from a lockout phase, the system must be powered down, the failure corrected, and then the system must be powered-up. At that point, the system will automatically enter the Initialization Phase. The "Phase Selection Switch" must be repositioned to the Initialization Position (at which time the setup parameters can be altered, if necessary) then repositioned again to the "Pre-Run Phase" and the key validation switch activated.

The setup parameters can only be altered in the Initialization Phase. To enter this phase, the locked control enclosure must be unlocked and opened, then the "Phase Selection Switch" must be set to the "Initialization Phase." The user setting switches must be altered and the setup parameters validated by inserting a key (not the same as for enclosure lock) in the key validation switch and turning from off to on to off.

A series of double-polled switches are used to select the desired Run Mode of the system. The switches create a binary word indicative of the mode chosen. One side of the switches are read by microprocessor A and the other side by microprocessor B. The microprocessor then compares the two for an inverse match. For example, if microprocessor A reads a closed position, then microprocessor B must read an open position. If there is an inverse match, the results and mode chosen are displayed to the setup person via the LCD display.

The timers of the Machine Primary Control Elements (MPCEs) must be set to the elapsed time period that their signals are to be received by the SRCS. This time period is selected by rotation of the timer and its value is displayed upon the LCD. If the optional Stop Performance Monitors (SPMs) selector switch is chosen, its timer must be activated similar to the MPCEs.

Selection of the Machine Cycle Timer depends on the Run Phase selection chosen and its time set to the desired time, similar to above. The Position Sensors are also dependent upon the Run Mode selection, and if required by the mode, must be connected to the SRCS. The start/restart actuator is required for all Run Modes and must be connected to the SRCS. The two-hand control is dependent upon the Run Mode selection, and if required by the mode, must be connected to the SRCS. The FSDs, SSDs, MIRs, and Auxiliary Signal Output are connected to the machine via the terminal connections within the SRCS.

To ensure that the Run Mode selected has been equipped with the proper inputs to perform its safety function, both microcontrollers independently poll their input connections. Each microcontroller must receive its anticipated signal, or the system will go into a closed loop waiting for connection of the device. If all the input signals for the peripheral devices agree with what is required for the chosen mode and the timer settings have been set, the microcontrollers compare their results. If they agree, the LCD display is updated with the setup parameters and the setup person validates the setup by actuating the key switch in the off/on/off sequence. At that point, the microcontrollers no longer poll any of their setup switches, timers, or inputs. Each microcontroller writes the setup parameters to its respective NOVRAM (Nonvolatile Random Access Memory). The information is then read from the NOVRAM and each microcontroller compares for agreement. If the data is in agreement, it is written to the RAM. The setup person now positions the "Phase Selection Switch" to the Pre-Run Mode and the Initialization Phase is complete. The system never again updates its setup parameters, so even if they are altered, the system will continue to function as intended by the qualified setup person.

Upon power-down and power-up of the system, each microcontroller retrieves its setup parameters from its NOVRAM and then polls the setup switches, timers, inputs, etc. If in agreement, the setup parameters are written to the RAM. The microcontrollers exchange information and compare the data. Any disparity results in a lockout.

Inherent in the system described above is a method of safeguarding personnel operating hazardous machinery. Such a method includes detecting an intrusion of an object into a hazard zone of a machine; initiating a motion-stopping sequence of the machine upon detection of the intrusion within the hazard zone within a fixed response time; monitoring the elapsed time between the intrusion into the hazard zone and the actual stopping of the machine; coupling the system to the machine with machine-interface means; and integrating the operation of the detecting means, the timing means, and the machine-interface means into a homogenous system.

The preferred method of safeguarding personnel operating hazardous machinery includes a method of detecting shorts between adjacent detectors in a light curtain system having adjacent detectors. The method of detecting such shorts includes turning on one emitter of the light curtain system; polling the corresponding detector of the emitter to make sure it has an illuminated signal; and removing power from all other detectors to see if any remain illuminated. It is to be understood that a similar method will detect shorts between adjacent detectors in such a system. In this method, both of the microcontrollers control the turning on and off of the various emitters and monitor the analog voltage of the corresponding detectors. If the analog voltage is present on any channel there is a short and a lockout condition will occur.

The preferred method may further include incorporating a two-hand control actuator as an integral part of the system; monitoring movable parts of the machinery to determine the position of those parts; processing the two-hand actuator signals in a dynamic two-channel arrangement; processing a machine-initiation relay output signal of the two-channel arrangement received from a machine-initiation relay; validating the ability of the MIR to go to an on/off state; producing a restart lockout upon operator-induced error; and producing a permanent lockout condition upon component or software failure.

These and other advantages of the present invention will become apparent upon review of the following drawings, the detailed description, and the appended claims.

BRIEF DESCRIPTION OF THE DRAWINGS

FIGS. 5A and 5B as a set show a conceptual block diagram of the preferred embodiment of the present invention incorporating the motion function, the stop function, and the monitoring function into a single homogeneous system.

FIG. 8 shows a two-hand control schematic.

FIG. 9 shows the various modes of operations of the present invention with safety interface requirements.

DETAILED DESCRIPTION OF THE PREFERRED EMBODIMENT

Figure 1:
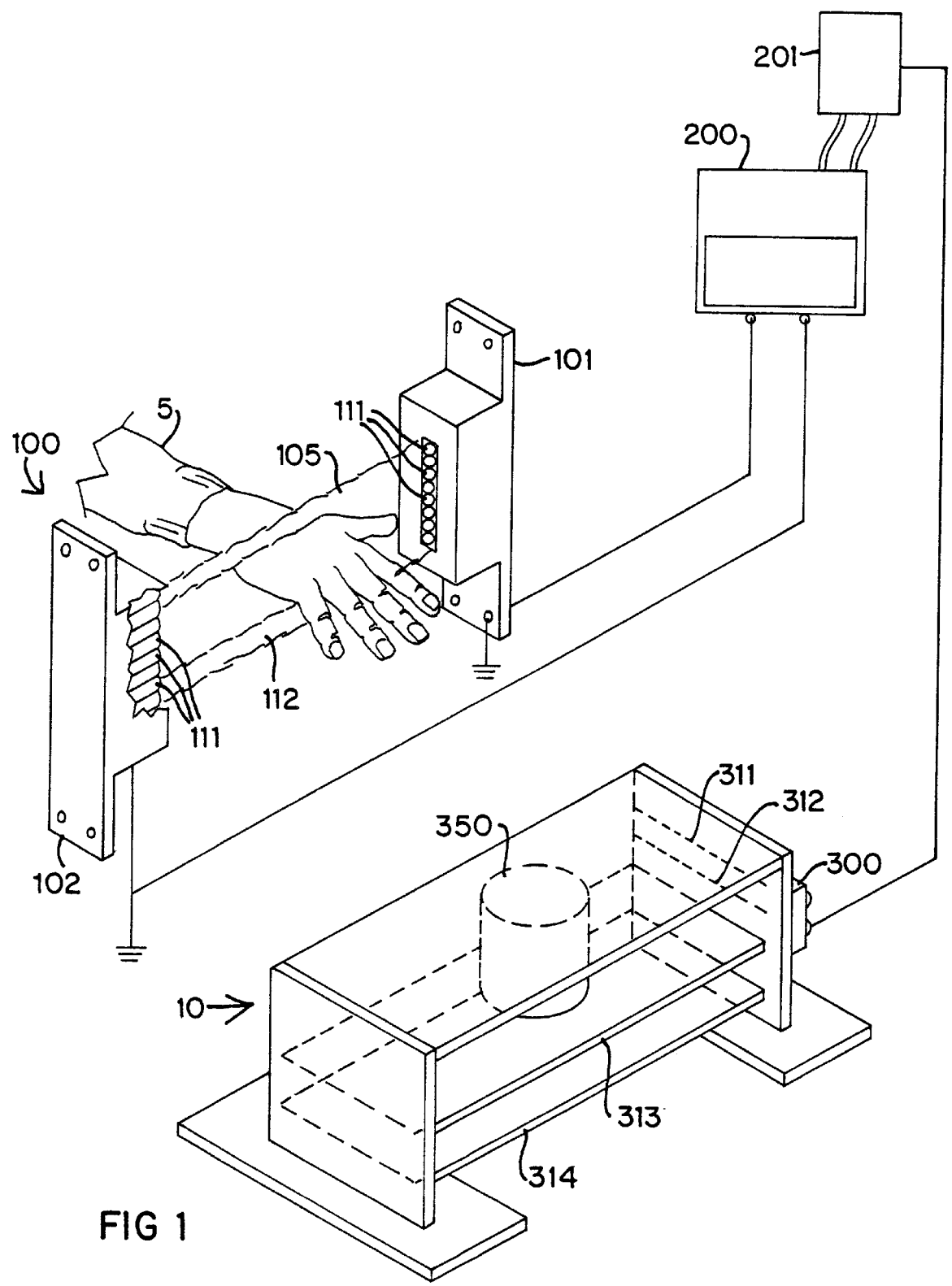
FIG. 1 shows a simplified diagram illustrating major components of the present invention.
Figure 2:
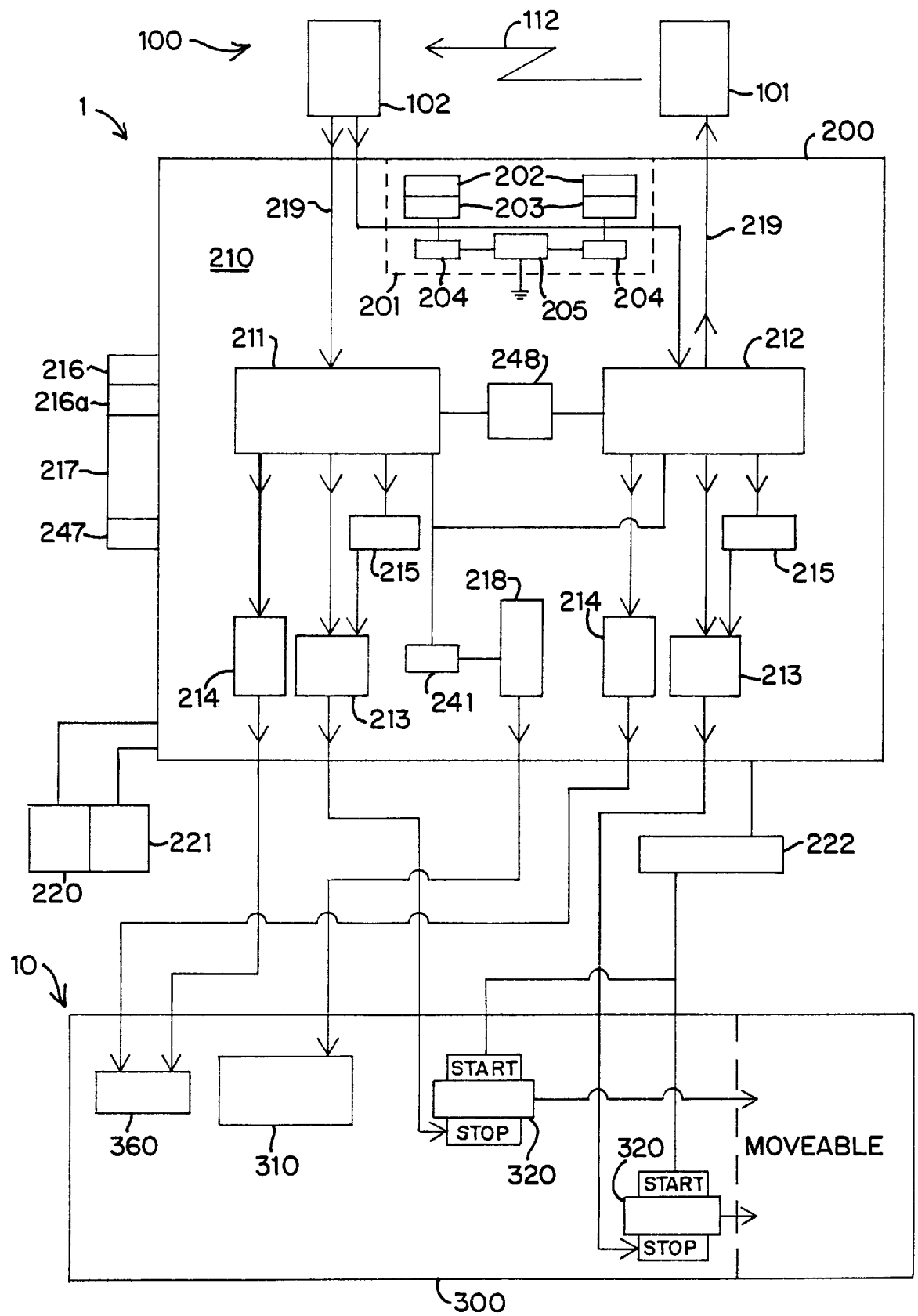
FIG. 2 shows a conceptual block diagram of the preferred embodiment of the present invention which incorporates the stop function.
Figure 3A:
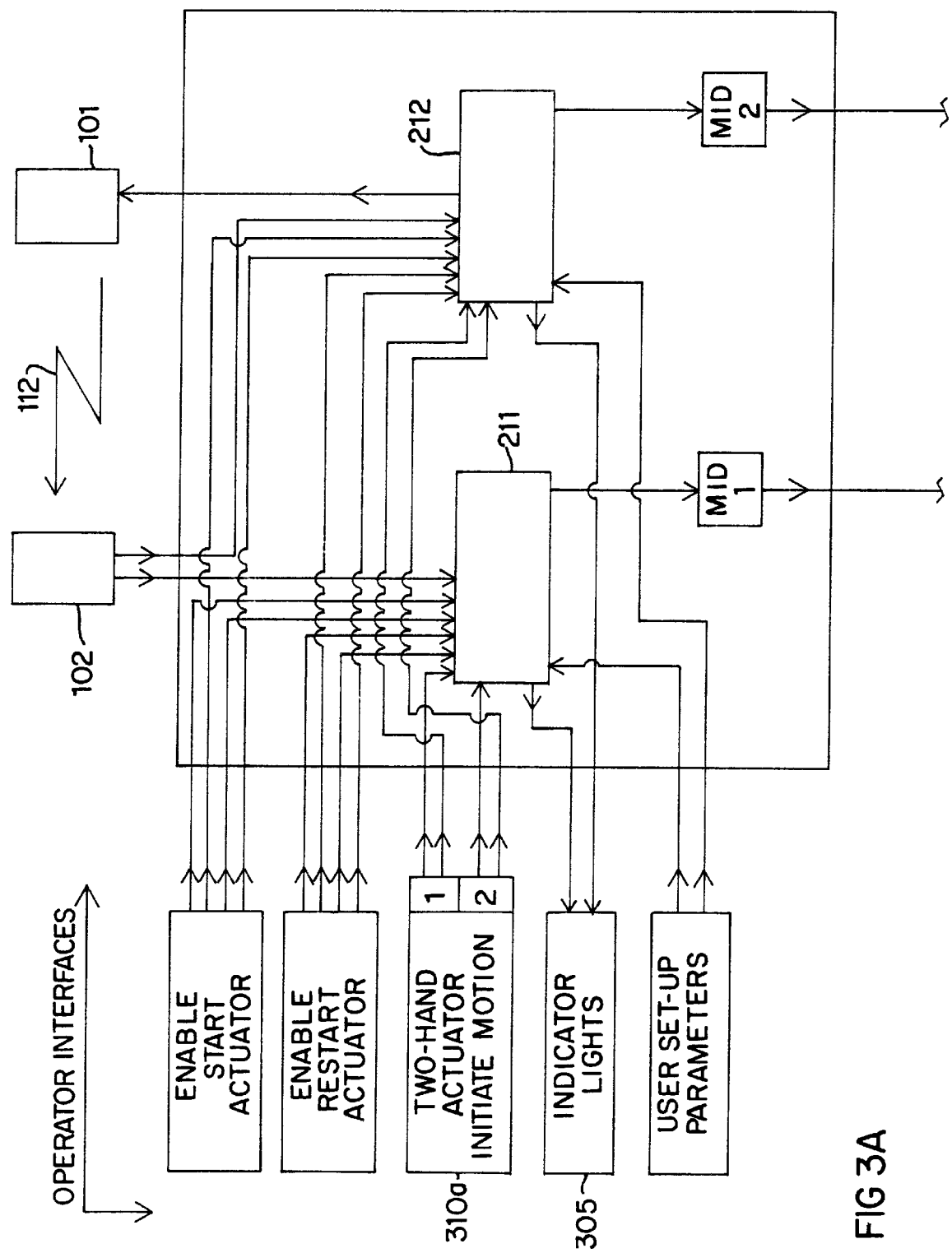
FIGS. 3A and 3B as a set show a conceptual block diagram of the preferred embodiment of the present invention which incorporates the motion function.
Figure 3B:
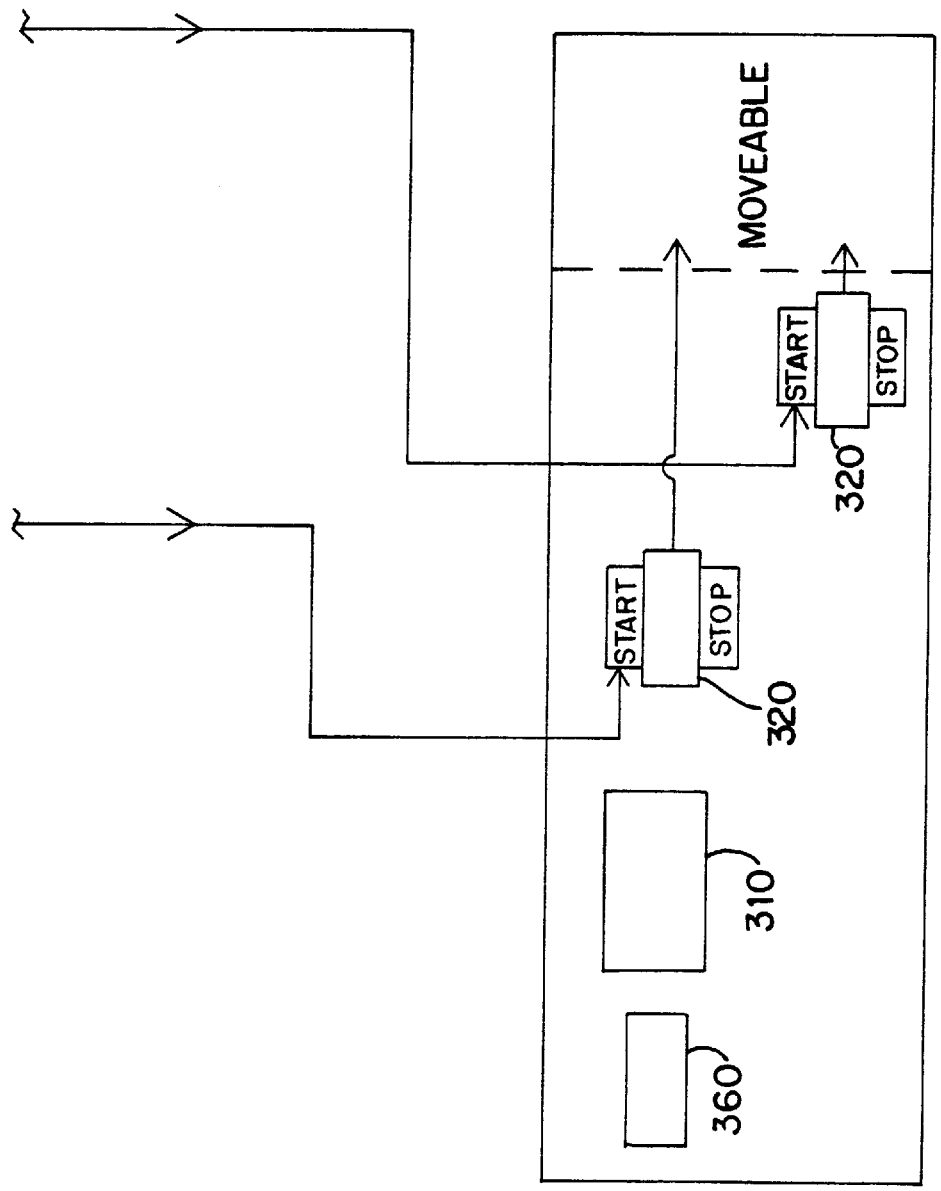
Figure 4A:
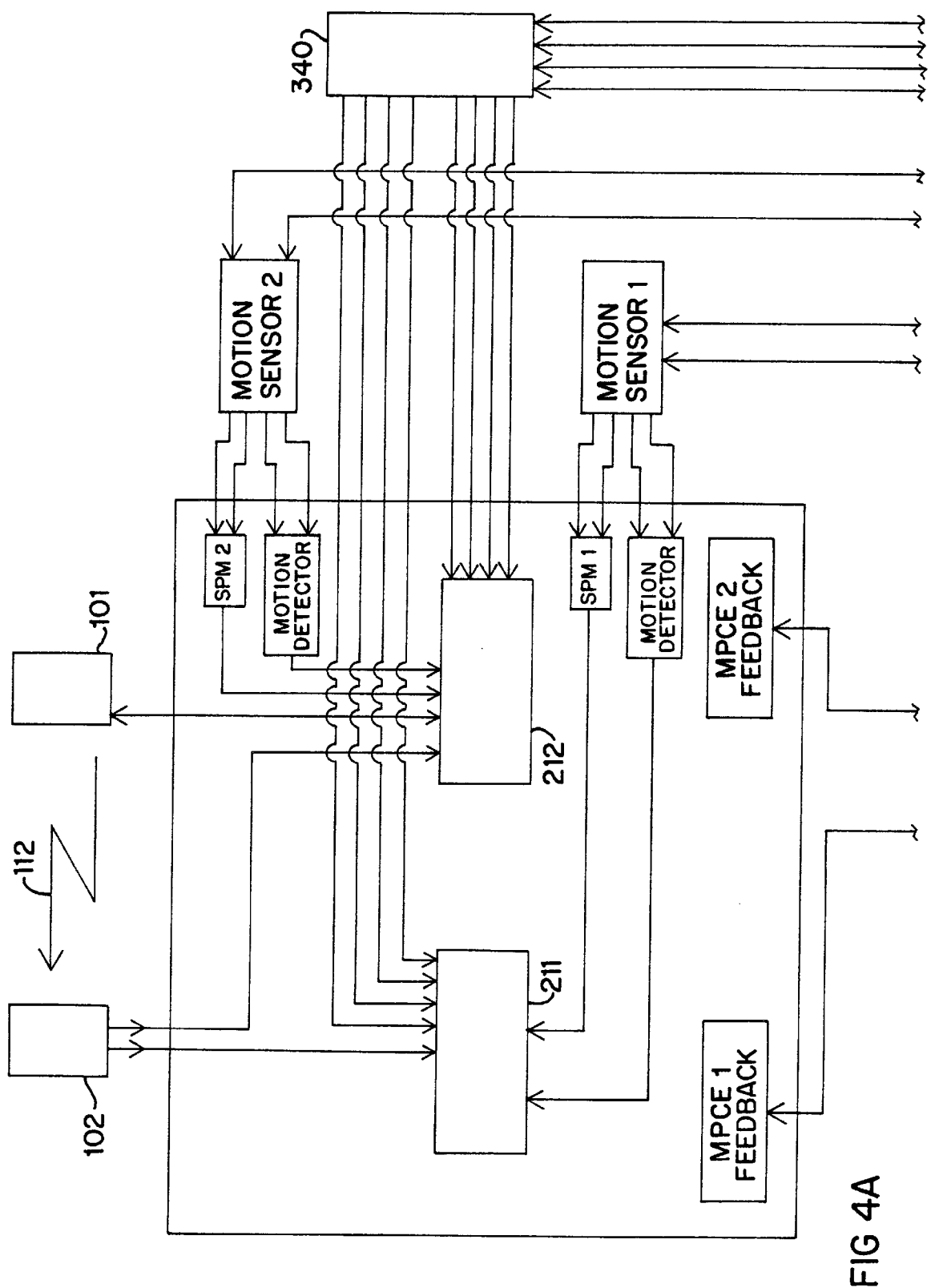
FIGS. 4A and 4B as a set show a conceptual block diagram of the preferred embodiment of the present invention which incorporates the monitoring function.
Figure 4B:
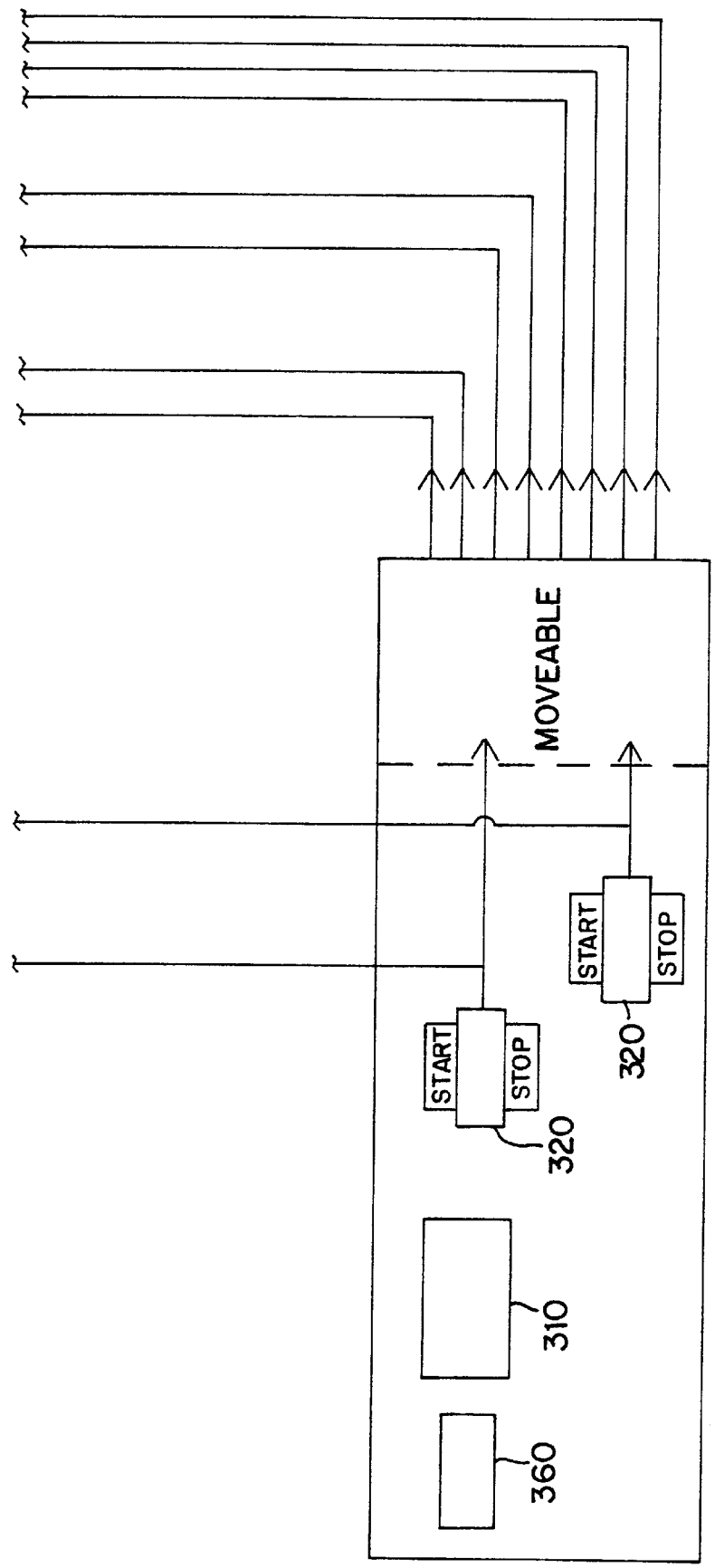
Figure 5A:
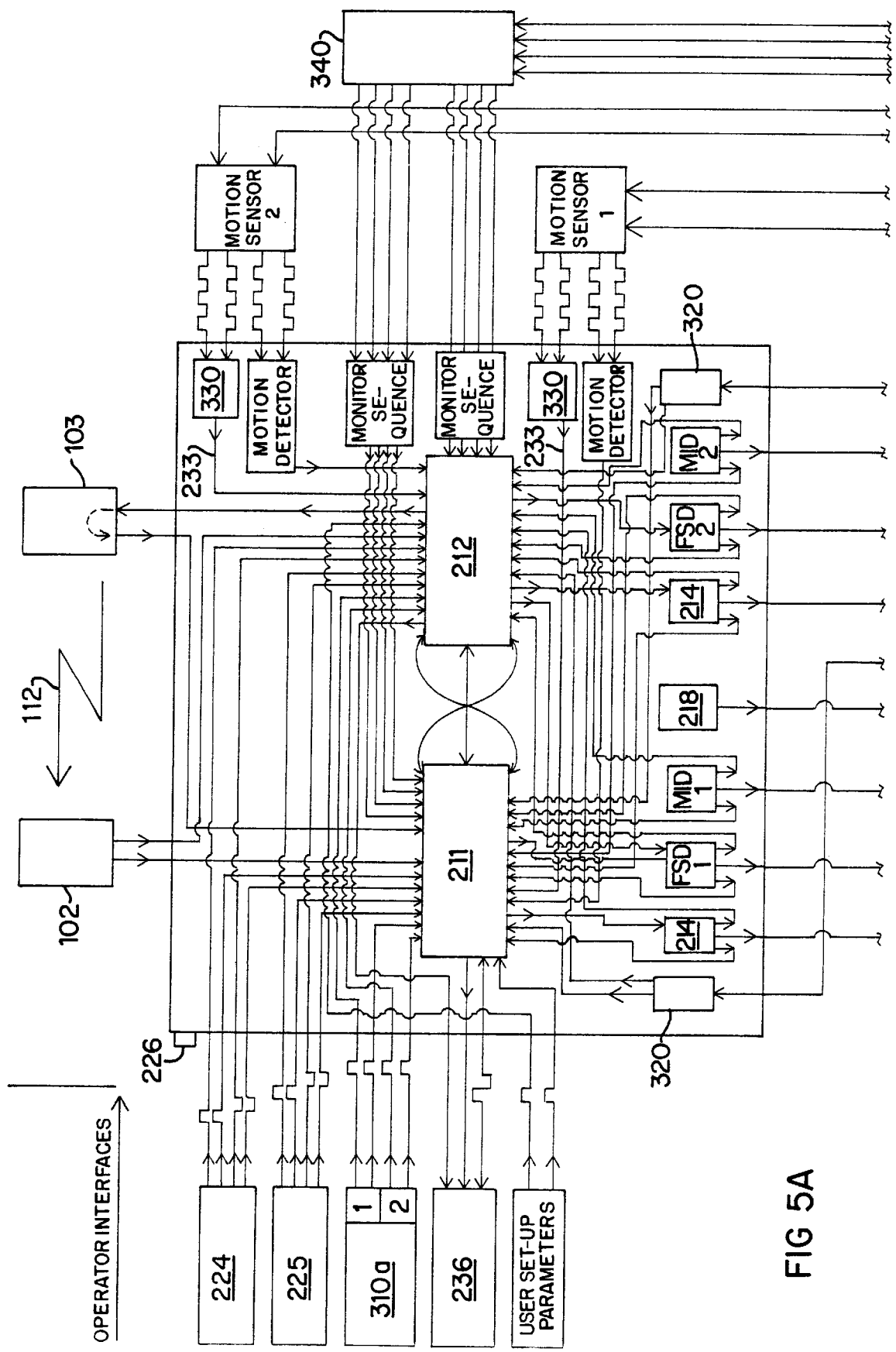
Figure 6:
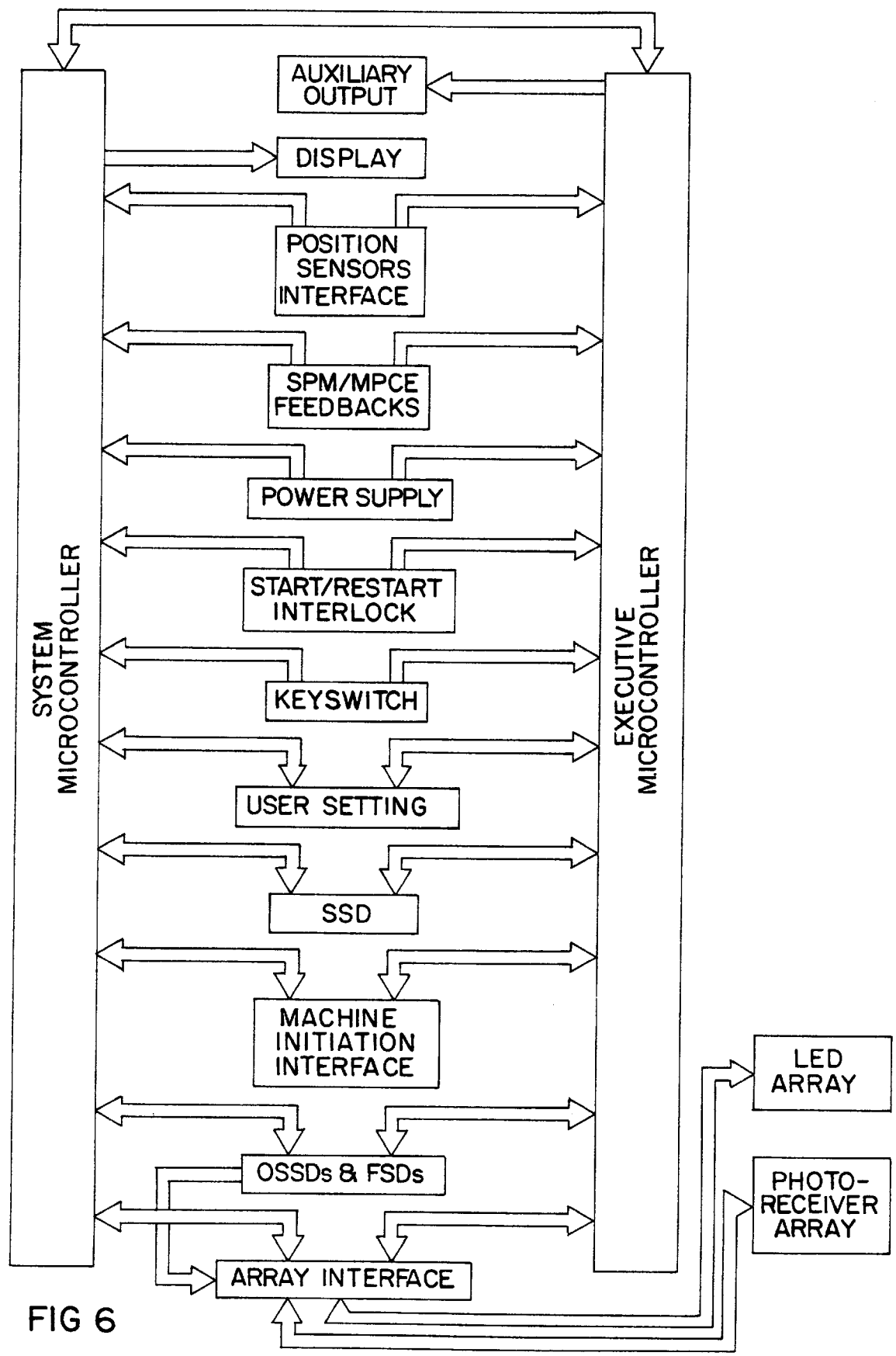
FIG. 6 shows a system block diagram of the preferred embodiment of the present invention.
Figure 7:
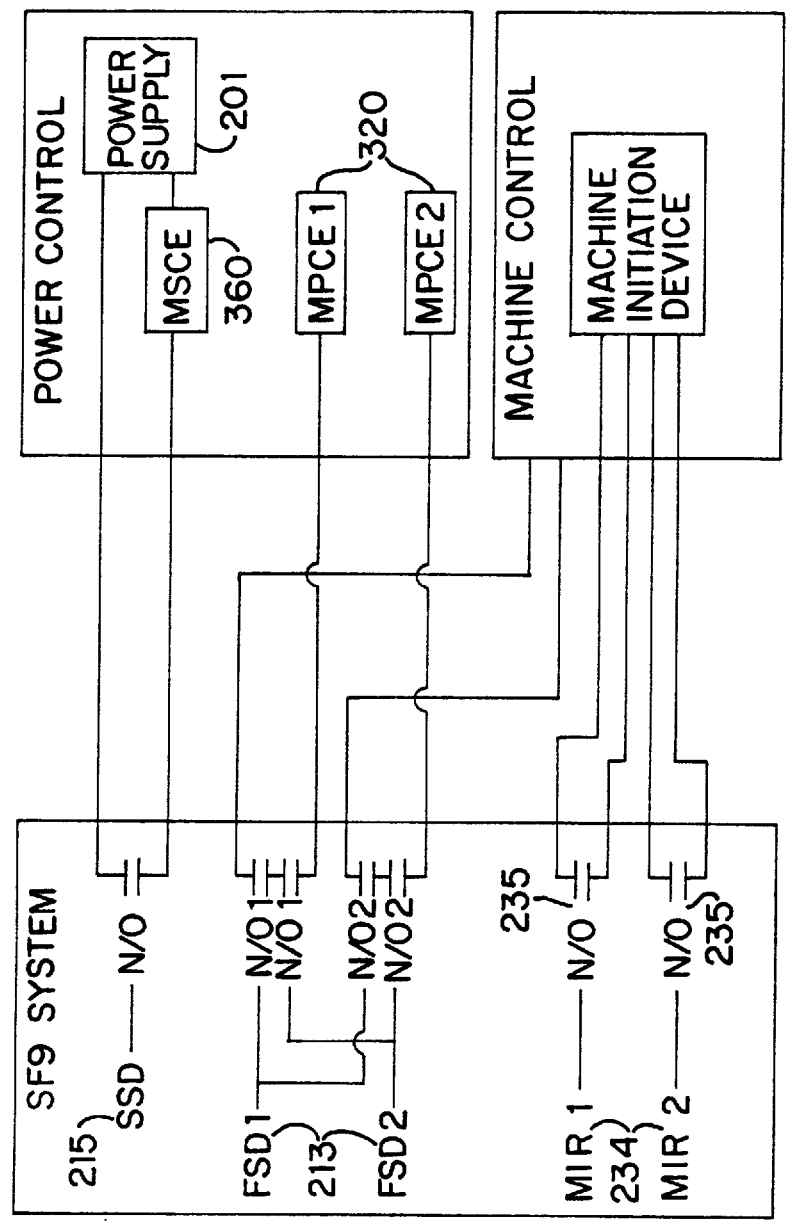
FIG. 7 shows a detailed illustration of the contact coupling of components of the machine control unit.

The general operation of the preferred embodiment of the present invention is illustrated in FIGS. 1–9 by a safety-related control system (SRCS) 1, comprising a human detection system 100, a main control unit 200, and machine-interface hardware 300. The objective of the SRCS 1 is to integrate the human detection system 100, main control unit 200, and machine-interface hardware 300 into a homogenous two-channel structure where an operator 5, a machine 10, and the SRCS 1 are monitored on a temporal basis and whereby any fault within the SRCS 1 and machine motion initiation and cessation are discovered within a predetermined response time in order to increase safety by stopping the machine 10. The SRCS 1 uses an integral two-channel communication network with comparison, dynamic signal processing, automatic self-checking, temporal measuring and sequential monitoring to detect random failures in the human detection system 100, main control unit 200, machine-interface hardware 300 including machine-initiation hardware 301, machine-motion control hardware 302, and operator-interface hardware 303 described herein. If a failure is detected, the SRCS 1 will go to a lockout condition.

The human detection system 100 includes an active opto-electronic protection device, that in the preferred embodiment is a safety light curtain or array 105. The array 105 includes a plurality of fixed light emitters 101 spatially positioned and aligned with a plurality of corresponding fixed detectors 102 to form a channel 111 between each emitter 101 and its corresponding detector 102. The channels 111 form a protection zone 112. From a functional and safety-related perspective, the height and width of the zone 112 should shield all hazardous areas of the machine 10. In the preferred embodiment of the SRCS 1, the depth of the zone 112 should be as shallow as possible so that the angle of divergence of the emitter 101 and the effective aperture angle of the detector 102 do not extend considerably beyond the protection zone.

In the preferred embodiment of the SRCS 1, the array 105 is capable of detecting intrusions into the zone 112 by objects of a specified size or larger. The detection capability of the array 105 depends on the spacing between the emitters 101, the spacing between the detectors 102, and control circuitry 210. The array 105 uses optical lensing, pulse modulation of the emitters 101, light-pulse signaturing, environmental learn mode, floating upper and lower signal threshold, and voltage-to-current conversion of the phototransistor signal to maintain constant object-size detection over the spanning distance. The control circuitry 210 distinguishes light from the emitters 101 from other bursts of radiation to prevent the array 105 from going into saturation and ensure the received light is the system's light. The SRCS 1 evaluates the light-signature pattern and performs automatic self-checks to ensure that there is no failure to danger when light from sources other than the emitter 101 is present at the emitter's corresponding detector 102. Such light may be in the form of fluorescent, incandescent, stroboscopic, daylight, radiation from another emitting element, radiation from a weld splatter, reflected, or similar light.

The main control unit 200 includes a power supply 201, the machine-interface hardware 300, machine-initiation hardware 301, machine-motion control hardware 302, operator-interface hardware 303, machine-stop hardware 304, communication indicators 305, and control circuitry 210. The power supply 201 is an A/C power supply with a double-pole magnetic circuit breaker 202 to protect the SRCS 1 from excessive current. An electromagnetic/radio-frequency interference (EMI/RFI) filtering device 203 is used to filter out electrical noise transmitted from or to the power line. A voltage selector 204 is used to select between 115 and 220 VAC operation. A transformer 205 isolates the SRCS 1 from the power line.

The control circuitry 210 of the preferred embodiment includes an executive microcontroller 211, a system microcontroller 212, two final switching devices (FSDs) 213, two secondary switching devices (SSDs) 214, two output signal switching devices (OSSDs) 215, a user settings control 216, a liquid crystal display (LCD) 217, an auxiliary output device 218, an array interface 219, a machine-initiation interface 220, two machine-initiation devices, a position sensor interface 221, two machine primary control element (MPCE) feedback devices 222, two stop position monitor feedback devices (SPM feedback devices) 223, a start interlock switch 224, a restart interlock switch 225, a keyswitch 226 and indicator lights 236.

The microprocessors are microcontrollers 211, 212 that have multiple digital inputs/outputs and analog inputs with internal ROM, RAM, EPROM, CPU, and analog-to-digital (A/D) devices. The integrity of internal microprocessor hardware is governed by computer-operating-properly (COP) enable, a clock monitor, and an external watchdog timer. The microcontrollers 211, 212 are not exactly the same so as to provide redundant system architecture diversity.

Both microcontrollers 211, 212 have embedded software that performs in real time and is inaccessible to the operator 5. The executive microcontroller 211 includes "executive" software and the system microcontroller 212 includes "system" software. The microcontrollers 211, 212 control all functions of the SRCS 1 (i.e., the human-detection system 100, the machine-initiation hardware 301, the machine-motion control hardware 302, the operator-interface hardware 303, the machine-stop hardware 304, the communication indicators 305, system automatic self-tests and self-calibration, and the other components described herein). At power-up, both microcontrollers 211, 212 perform all automatic self-testing checks prior to allowing the machine 10 to move. If all tests are passed, the system allows the machine 10 to go in motion for a dummy cycle in which all machine peripheral movables are monitored for state and response time. Any failure will result in the lockout condition. If no failure is detected, the microcontrollers 211, 212 then perform the function of scanning the entire zone 112, one channel 111 at a time. If an object penetrates the zone 112, the microcontrollers 211, 212 de-energize the FSDs 213 and verify that the MPCE feedback device 222 has responded correctly to the de-energization of the FSDs 213. Both microcontrollers 211, 212 also verify that the SPM feedback device 223 and a machine motion signal indicate that the machine has stopped within a preset feedback time previously selected for the SPM feedback device 223. If they do not indicate that the machine 10 has stopped, then both of the microcontrollers 211, 212 de-energize all of the relays, including the SSDs 214, and the SRCS 1 remains in the lockout condition.

In addition to performing those functions, both microcontrollers 211, 212 perform automatic checks to detect any failures of the entire SRCS 1. The microcontrollers 211, 212 further control the timing of the SRCS 1 while intercommunicating between each other to ensure synchronization and detection of any disparity of data. If any disparity is detected, the control circuitry 210 sends a signal to the machine-interface hardware 300 to stop the machine 10 and prohibits further access to the machine 10 by the operator 5. Each of the microcontrollers 211, 212 "knows" the status of the other microcontroller at all times and either one may shut off the machine 10 in the event of any failure of the human detection system 100, the control circuitry 210, or the machine-interface hardware 300.

The FSDs 213, and the SSDs 214 interface with the machine-interface hardware 300 in order to stop the machine 10 on command. The FSDs 213 and the SSDs 214 are dissimilar safety relays associated with unrelated parts of the machine 10. The FSDs 213 interface with a machine primary control element (MPCE) 320 and the SSDs 214 interface with secondary control elements. The FSDs 213 and SSDs 214 are force-guided contacts, and each employs redundant voltage transient protection and is monitored and controlled by both microcontrollers 211, 212. In the event of an object penetrating the light curtain, the OSSD 215 sends a signal to the FSDs 213, wherein the FSDs 213 initiate a machine stop command via the MPCEs 320. In the event of failure, the SSDs 214 send a signal to the machine secondary control elements (MSCE) 360 of the machine 10 to disable all machine functions.

The SRCS 1 has a phase selection switch 216a as a component of the user-settings control 216 to enable qualified personnel to enter the three phases of operation including: Initialization, Pre-Run, Run, and to recover from the Lockout condition phase. In the Initialization phase, the parameters of the system are established. The microcontrollers 211, 212 record data that is later used to check and test various aspects of the SRCS 1. During the Pre-Run phase, all automatic self-verification checks are completed by the SRCS 1. In the Run phase, one of the six modes of operation discussed below is selected. The lockout condition is a phase that the SRCS 1 enters upon any failure and prohibits the operator 5 from operating the machine 10 until it is determined to be safe. Recovery from a lockout condition can only be achieved by correcting the detected problem and revalidating the SRCS 1 via the keyswitch 226.

During the Run phase, the user-settings control 216 allows qualified personnel to set six different modes of operation including: Guard, Automatic, Mute, Mute with Manual Machine Initiation Interface, Guard with Manual Machine Initiation Interface, and Presence Sensing Machine initiation (PSDI). These modes are incorporated into the human detection system 100, the control circuitry 210, and the machine-interface hardware 300. These different modes are available to accommodate for different types of machines. The desired mode must be selected at the time of initial power-up. The microprocessors 211, 212 perform all automatic self-checks in all modes of operation and verify any new settings upon subsequent power-ups. If the SRCS 1 is in the lockout condition, then the microprocessors 211, 212 require that the key-switch 226 be activated by qualified personnel before machine operation can be resumed. The SRCS 1 is in the start interlock lockout condition at every power-up and hence requires that both microprocessors 211, 212 verify activation of the start interlock switch 224. Similarly, if the SRCS 1 is in the restart interlock lockout condition then the microprocessors 211, 212 also verify activation of the restart interlock switch 225. Additional automatic checks are included where the desired mode requires additional feedback.

The Guard mode is the basic mode of operation wherein an interruption of the zone 112 initiates an output from the FSDs 213 to stop the motion of the machine 10. When the zone 112 is cleared, the FSDs 213 restore normal operation of the machine 10.

The Automatic mode is similar to the Guard mode, except the FSDs do not restore normal operation of the machine until the start or restart interlock switch 224, 225 is actuated.

During the Mute mode, the FSDs 213 provide an output only if the zone 112 is interrupted during a hazardous portion of a machine cycle. If the zone 112 is penetrated during the hazardous portion of the cycle, the SRCS 1 initiates a lockout condition. Activation of the start or restart interlock switch 224, 225 is required before re-initiating another machine cycle. A mute indicator light 247 indicates that the machine 10 is in its mute cycle of operation.

In the Mute with Manual Machine Initiation Interface mode, a two-hand control 310 is interfaced with the Mute mode of operation. Inputs from the two-hand control 310 interface with the control circuitry 210.

The Guard with Manual Machine Initiation Interface mode is similar to the Mute with Manual Machine Initiation Interface mode, except if the zone 112 is penetrated during the non-hazardous portion of the machine cycle, the SRCS 1 initiates a stop command by way of its FSDs.

The PSDI mode provides initiation of the next machine cycle in response to a correct number of interruptions of the zone 112 during the muted cycle of the machine 10. The PSDI mode can function in a single break mode (one interruption and restoration) or a double-break mode (interruption and restoration occurring twice). The interruptions must occur within a given time period or the restart interlock lockout condition will occur requiring a restart. If an interruption of the zone 112 occurs during the hazardous portion of the machine cycle, the FSDs 213 and two machine initiation relays (MIRs) 234 will de-energize and remain in the restart interlock lockout condition requiring a restart and a two-hand control actuator cycle. If certain conditions are satisfied, the MIRs 234 will initiate the next machine cycle.

The two-hand control 310 and a position sensor set 340, including a dead-top sensor 341, a near-top sensor 342, a near-bottom sensor 343, and a dead-bottom sensor 344 are required when operating in the Mute with Manual Machine Initiation Interface, Guard with Manual Machine Initiation Interface, and PSDI modes. The cycle position of the machine 10 is determined by the microcontrollers 211, 212 based on signals from the four position sensors 340. In the PSDI mode, the two-hand control 310 is used for the first machine cycle after the start interlock lockout condition or the restart interlock lockout condition. Four input signals from the two-hand control 310 are required and the MIRs 314 provide a cycle initiation output signal to resume operation of the machine 10.

When operating in the Mute with Manual Machine Initiation Interface, Guard with Manual Machine Initiation Interface, and PSDI modes, the control circuitry 210 does not allow a mute condition on the first machine cycle after the lockout condition, so that the control circuitry 210 can validate the proper functioning and sequencing of the position sensors 340. In these modes, the control circuitry 210 energizes the MIRs 234 in order to start a new machine cycle and de-energizes the MIRs 234 when the machine cycle reaches the near-bottom sensor 343.

In operation, the SRCS 1 uses a series of automatic self-checks to determine the exact cause of any fault. The SRCS 1 then communicates a coded "error" message identifying the fault to the operator 5 by way of the LCD display 217. The coded error message may then be referenced in a maintenance manual for trouble shooting suggestions. The LCD display 217 interfaces with the system microcontroller 212 and may also communicate other status messages.

The auxiliary output device 218 is an output device that corresponds concurrently with the FSDs 213 for interfacing the SRCS 1 to the machine control after interruption of the protection zone. Upon interruption of the zone 112, the auxiliary output device 218 sends a signal to the machine control so that a stop condition can be actuated. The connection to the machine control is buffered and isolated through an optocoupler 241. Upon normal interruption of the zone 112, the auxiliary output device 218 simultaneously produces an output that the FSDs 213 are de-energized. However, if a fault occurs, creating a lockout condition, the auxiliary output device 218 produces a pulsating output to the machine control, so that the machine control can take appropriate action.

All data transmitted between the array 105 and the main control unit 200 are sent through an array interface 219 comprising a plurality of buffers. The signals are transmitted in the form of current and then converted to voltage at the receiving end. By sending the data through the array interface 219, the microcontrollers 211, 212 can verify that the proper codes for channel selection were transmitted and received.

The machine initiation interface 220 includes the two MIRs 234 that are electrically connected to the two-hand control 310. The MIRs 234 may be used to manually initiate a machine cycle. Each microprocessor 211, 212 controls one of the MIRs 234. Each MIR 234 has two N/O (normally-open) contacts 235 for controlling the machine 10 and two mechanically-linked N/C (normally-closed) contacts for safety monitoring. The two N/C contacts are monitored by the microprocessors 211, 212 with each microcontroller monitoring the other microcontroller's MIR 234. Both MIRs 234 employ redundant voltage transient protection. Automatic self-checks are carried out by the SRCS 1 to check the ability of the FSDs 213, SSDs 214, and MIRs 234 to perform safety functions.

The position sensor interface 221 includes an optocoupler connected between each of the four position sensors 340 and the microcontrollers 211, 212 in order to isolate the control circuitry 210 from outside electrical interference. The position sensor interface 221 is required when operating in the Mute, Mute with Manual Machine Initiation Interface, Guard with Manual Machine Initiation Interface, and PSDI modes.

The MPCE feedback device 222 and the SPM feedback device 223 receive signals from a MPCE 320 and an SPM 330, respectively. The microcontrollers 211, 212 monitor these feedback devices 222, 223. These feedback devices are isolated from the control circuitry 210 to safeguard against outside electrical interference.

The start or restart interlock switches 224, 225 are heavy duty push-button type switches and are connected to both microcontrollers 211, 212. The start and restart interlock switches 224, 225 may be the same switch. It is also connected to the machine-interface hardware 300 and is electrically isolated. The SRCS 1 monitors the start or restart interlock switches 224, 225 to ensure that they are not stuck in a permanent ON-state. The SRCS 1 will go into a lockout condition if a fault is detected in either of these devices. Systematic failure will result in a start interlock lockout condition and operator-induced errors will result in a restart interlock lockout condition.

The keyswitch 226 is a key-operated switch that enables qualified personnel to recover from the lockout condition 240 after the SRCS 1 has been restored to proper order. The keyswitch is connected to each of the microcontrollers 211, 212.

The machine-interface hardware 300 is hardware that is attached to the machine 10 for interfacing the main control unit 200 with the machinery 10. The machine-interface hardware 300 includes a two-hand control 310, the machine primary control element (MPCE) 320, the stop position monitor (SPM) 330, and four position sensors 340.

The two-hand control actuator 310 is mechanically linked to the machine-interface hardware 300 for manually initiating a cycle of the machine 10. The two-hand control 310 generates four signals; two for each hand switch of the two-hand control 310. The SRCS 1 monitors the two-hand control actuator 310 to detect any safety-related faults or any temporal actuation deviances created by the operator 5.

The SRCS 1 tests the MPCE 320 and SPM 330 to ensure that they are functioning properly and have not been disconnected. Any such failure will result in the lockout condition. In the Initialization phase, a qualified person sets adjustable timers for both the MPCE 320 and the SPM 330. The time allotted to the MPCE 320 is the elapsed time from the last unblocked scan of the array 105 to the change of state of the last element in the stop chain of command of the machine 10. That time interval includes the response times of any OSSDs 215, FSDs 213, and all interposing machine devices. The time allotted to the SPM 330 is the elapsed time from the last unblocked scan of the array 105 to the cessation of motion of the machine's movable parts. Those settings are read and compared by both microcontrollers 211, 212. The time period set for the SPM 330 must be greater than that for the MPCE 320, otherwise the lockout condition will occur. Both microprocessors 211, 212 verify that all timing data is accurate. If a disparity exists in their readings, the SRCS 1 will go into the lockout condition. In this manner, the microprocessors 211, 212 monitor the elapsed time between an intrusion into the zone 112 and actual stopping of the machine 10.

In the preferred embodiment, the position sensor interface 221 attaches to the four position sensors 340 to determine the position of a ram 350 of the machine 10. In the preferred embodiment, the position sensors 340 are located at a dead top position 311, a near top position 312, a near bottom position 313, and a dead bottom position 314 of a cycle of operation of the machine 10. The SRCS 1 performs automatic self-checks on the position sensors 340. If a fault is detected, the SRCS 1 will go into the lockout condition.

AUTOMATIC SELF-CHECKS

The automatic self-checks include an Accumulated Response Time Check, an FSDs Coil Test, an FSD Integrity Check, an MPCE Feedback Check, an MPCE Feedback Check, an SPM Feedback Check, an SSDs Coil Test, an SSDs Integrity Check, a Position Sensors Check, a Mute Function Check, a Mute Indication Lights Test, a Machine Cycle Time Out Test, a Two-Hand Control Switch Check, an MIR Integrity Check, a Hardware Mismatch Check, a User-settings Check, a Keyswitch Check, a StartRestart Check, a Clock Monitor Check, a Computer Operating Properly Check, a Data Transmission and Processing Check, an Internal Code Verification Check, a RAM/ROM/A to D/CPU Test, a Light Source Signature Check, an LED Short Test, a Photoreceiver Shorts Test, and a Complete System Integrity Check. The detection method of each of the automatic self-checks is a two-channel dynamic signal technique that includes a disparity check of the dynamic signals and the temporal, static, and sequential states. A detection of a fault in those checks results in the lockout condition and an error message is displayed on the LCD display 217.

The purpose of the Accumulated Response Time Check is to ensure that each event in a chain of events from the interruption of the zone 112 to the actual stopping of the machine 10 occurs within a required time period. That time period clocks the elapsed time from the moment of interruption of the zone 112 until the appropriate feedback signals are received. This check occurs every time an interruption of the zone 112 takes place. The devices tested include an electro-sensitive protection device (ESPD) and the OSSD 215, FSDs 213, MPCE 320, and SPM 330. The state change time of each device is individually clocked from the interruption of the ESPD so that no accumulation of time occurs between elements in the stop command chain.

The FSDs Coil Test checks the ability to energize and de-energize the FSD coils, OSSD, and related circuitry. This test occurs during the "Complete System Integrity Check."

The FSD Integrity Check detects the ability of the FSDs 213 to open FSD N/O contacts 213a in a predetermined time by monitoring the closing of FSD mechanically-attached N/C contacts. In this check, both microcontrollers 211, 212 monitor both FSDs 213 after de-energization of the FSD coil.

The MPCE Feedback checks are conducted to verify that the MPCE 320 is responding correctly. This check occurs during interruption of the zone 112.

In the SPM Feedback Check, the SPM sensors are tested in order to detect any absence or delay in stopping the motion of the machine 10. This check occurs every time there is an interruption of the zone 112.

The SSDs Coil test detects the ability to actuate/de-actuate the SSDs coil and related circuitry. This test occurs during the "Complete System Integrity Check."

The SSDs Integrity Check detects the ability of the SSDs 214 to open or close their contacts. In this check, both microcontrollers 211, 212 monitor the SSDs 214 and their related circuitry during the Initialization phase.

The Position Sensors Check verifies the activation/de-activation of the position sensors 340 and that the sequential order of that activation/de-activation is proper. Upon entering the Run phase, the machine 10 must complete one "dummy" cycle in order to verify proper operation of the position sensors 340. The array 105 is in Guard mode for the entire "dummy" cycle.

The Mute Function Check ensures that muting of the FSDs 213 occurs only if the position sensors 340 are properly functioning and properly installed. This check is continuously performed throughout the Run phase.

The Mute Indication Lights Test ensures that the mute function can be activated only if the visual indication is functional. The microprocessors 211, 212 validate the on/off logic status of the mute indicator light 247. This test occurs for every machine cycle.

The Machine Cycle Time-out Test checks the position sensors to make sure that the cycle time of the machine 10 has not exceeded its preset limit for the selected mode of operation. In this test, the microprocessors 211, 212 count down time from the start of each machine cycle. If the preset time limit is exceeded, the restart interlock lockout condition is initiated.

The Two-Hand Control Switch Check ensures that both two-hand control switches can change states within a specified time period, can be actuated for each machine cycle, and are being kept in the depressed state for the entire hazardous portion of the machine cycle. This check occurs during each cycle at the end of the non-hazardous motion, just prior to the start of the hazardous motion, and continues for the entire hazardous portion of the machine cycle. If a systematic failure is detected, the SRCS 1 goes to lockout condition. If an operator error is detected, the SRCS 1 goes to the restart interlock lockout condition.

The MIR Integrity Check ensures that both MIRs 234 can change states within their allocated times. Both microprocessors 211, 212 monitor both MIR control contacts 235 for each machine cycle.

The Hardware Mismatch Check detects any incompatibility of the array 105 and control circuitry 210. During alignment of the array 105, maintenance personnel is prevented from matching incompatible components to the SRCS 1. This is accomplished by identifying each sub-component of the SRCS 1 with a user-inaccessible means installed at the time of manufacturing.

The User Setting Check detects alterations of the User-settings Control 216. This check is accomplished during the Initialization phase by comparing the present setting with the previously known setting stored in the non-volatile memory (NOVRAM). This involves checking the setting of the user setting control 216, time setting of the SPM 330, time setting of the MPCE 320, NOVRAM, MPCE selection setting, and the SPM selection setting. If a discrepancy is detected, revalidation by qualified personnel is required.

The Keyswitch Check ensures that if the keyswitch 226 is left in an active position, the control circuitry 210 does not accept it as an affirmative validation to change of operational mode. Keyswitch activation triggers only upon an "off" to "on" to "off" transition. This check occurs during the Initialization phase if there is a change of the user setting control 216 or a lockout condition.

The Start/Restart Check ensures that if the start or restart switch 224, 225 is left in an active position, the control circuitry 210 does not accept it as an affirmative response. Start/restart switch activation triggers only upon an "off" to "on" transition. This check occurs during the Initialization phase if there is a start interlock lockout condition or during the Run phase if there is a restart interlock lockout condition.

The Clock Monitor Check detects the absence of or a slow microcontroller clock 248. This check is controlled by hardware and software and is continuous throughout all operations of the SRCS 1.

The Computer Operating Properly Check detects software failures due to improper program sequence. During this check, tests are continuously performed on both microcontrollers 211, 212.

Data Transmission and Processing Checks verify that data sent between the microcontrollers 211, 212 occurs within an accepted time frame. In the preferred embodiment, the executive microcontroller 211 expects data transfer from the system microcontroller 212 every 250 μS. The executive microcontroller 211 has an internal time-out function to verify the transfer of data within that time frame.

The Internal Code Verification Check verifies that both microcontrollers 211, 212 are generating proper functional and synchronous 4-bit and strobe codes and that the proper code was received by the emitters 101 and detectors 102 of the array 105. Both microcontrollers 211, 212 independently generate the next sequential code and then exchange and compare their codes. The system microcontroller 212 then transmits such code to the array 105 and the executive microcontroller 211 verifies that the code was properly received by the array 105. The code generation sequences of the microcontrollers 211, 212, and any multiplexers, buffers, interconnecting cables, etc., are tested. All possible combinations of codes are checked every 25 mS.

The RAM/ROM/A to D/CPU Test detects software corruption within the microcontrollers 211, 212 using proven algorithms. This occurs at power-up prior to performing any other tests and continuously thereafter. The Light Source Signature Check ensures that light received by the detectors 102 is being generated only by their corresponding emitters 101. Each light beam is transmitted by binary code during a small cycle. Samples of the light pulses are recorded to determine the profile of the detector signals. During the Pre-run phase, 256 samplings are recorded and averaged to establish an individual light pattern ("signature") for each channel 111. During the Run phase, each channel 111 polled is verified against its own "signature." Each microcontroller 211, 212, then compares those results to the recorded "signature." This test occurs continuously and ensures that the effects of ambient light, visible or invisible, AC or DC, do not affect the sensing function.

The LED Shorts Test ensures that light is emitted by only one emitter 101 to its corresponding detector 102 at any given time. This test involves forward biasing one emitter 101 and scanning the other emitters 111 to ensure that they are not forward biased. This occurs continuously.

The Photoreceiver Shorts Test ensures that light is received by only one detector 102 from its corresponding emitter 101 at any given time. This test involves enabling only one detector 102 at a time and then scanning the forward current of all the other detector 102. A short between any two detectors 102 will produce a light signal in two different time periods of the scan. This test is performed continuously.

The Complete System Integrity Check verifies the ability of the array 105 to detect an intrusion into the zone 112 and produce a corresponding output. At the end of a full scan (65 small scans), the microcontrollers 211, 212 create a simulation of a blocked channel by overriding the microcontroller's activation of the emitter 101. Both microcontrollers 211, 212 must detect a darkened channel and de-energize both FSD coils. An FSD coil feedback signal is verified by both microcontrollers 211, 212 and an override signal is sent to the FSD coils before FSD contacts can open. This test must be performed once and only once within a full cycle.

Although the preferred embodiment of the present invention has been described herein, it is to be understood that the above description is merely illustrative. Other means and methods may be substituted for particular features and processes, or particular parts of the whole may be implemented, without deviating from a rapid, reliable control system as described herein. Accordingly, it is to be understood that the present invention is not limited to that precisely shown and described.

We claim:

1. A control system for detecting and initiating cessation of hazardous machinery, said system comprising:
   a. detecting means for sensing an intrusion of an object into a hazard zone of machinery;
   b. means for initiating a stop of motion of said machinery within a fixed response time;
   c. temporal monitoring means to monitor an elapsed time between detection of said intrusion into said hazard zone and a change of state of at least one interposing device within a stop sequence of said machinery, wherein the at least one interposing device is designed to effect stopping of said machinery;
   d. machinery-interface means for connecting said system to said machinery; and
   e. a controller for controlling said detecting means, said means for initiating said stop motion, said temporal monitoring means, and said machinery-interface means, wherein said controller is designed to control said means for initiating said stop motion in conjunction with said temporal monitoring means so as to determine that said change of state of said one or more interposing devices occurs within said fixed response time in order to stop motion of said machinery within a desired period of time.

2. The system as claimed in claim 1 wherein said temporal monitoring means further monitors an elapsed time between said intrusion of said object into said hazard zone and cessation of motion of said machinery so as to confirm that the at least one interposing device within said stop sequence has caused said machinery to cease motion within said desired period of time.

3. The system as claimed in claim 2 wherein said temporal monitoring means is designed to permit manual setting of said cessation of motion of said machinery when said intrusion of said object into said hazard zone is sensed.

4. The system as claimed in claim 1 wherein said detecting means is a light curtain-presence sensing system.

5. The system as claimed in claim 4 wherein said light curtain-presence sensing system includes distinguishing means to distinguish light from said detecting means from other bursts of radiation.

6. The system as claimed in claim 5 wherein said distinguishing means prevents said light curtain-presence sensing system from going into saturation.

7. The system as claimed in claim 5 wherein an ambient light setting value is factored in with system-generated light by said light curtain-presence sensing system, and wherein said light curtain-presence sensing system is designed to take into account said ambient light setting value in a self-calibration for detection of said intrusion into said hazard zone.

8. The system as claimed in claim 4 wherein said detecting means includes a light curtain system having adjacent detectors and adjacent emitters, the system further comprising means for detecting shorts between said adjacent detectors, said means for detecting shorts comprising:
   a. means for turning on an emitter of said adjacent emitters of said light curtain system;
   b. means for polling a detector corresponding to said emitter to confirm whether said emitter provides an illumination signal; and
   c. means for removing power from others of said adjacent detectors to determine whether any of said others of said adjacent emitters is illuminated.

9. The system as claimed in claim 1 wherein said means for initiating a stop motion includes at least one final switching device and at least one secondary switching device, wherein said secondary switching device and said final switching device are dissimilar safety relays associated with unrelated parts of said machinery, wherein said final switching device interfaces with primary control elements of said machinery, and wherein said secondary switching device interfaces with secondary control elements of said machinery.

10. The system as claimed in claim 9 wherein said means for initiating a stop motion further includes at least one output signal switching device which commands an open state of said final switching device, wherein said final switching device initiates a machine stop command associated with said change of state of the at least one interposing device.

11. The system as claimed in claim 10 further including at least one dual encoder to determine motion of said machinery with said dual encoder providing two or more optical signals that indicate incremental movement of said machinery.

12. A control system for detecting and initiating motion of machinery, said system comprising:
   a. means for enabling motion of said machinery;
   b. means for initiating motion of said machinery;
   c. means for detecting motion of said machinery, wherein said means for detecting motion of said machinery is placed proximal to said machinery;
   d. means for determining positioning of one or more movable parts of said machinery; and
   e. a controller coupled to and for controlling:
      i. said means for enabling motion of said machinery,
      ii. said means for initiating motion of said machinery,
      iii. said means for detecting motion of said machinery, and
      iv. said means for determining positioning of said one or more movable parts,
   wherein said controller is coupled to said machinery in a manner that regulates motion of said machinery based upon receiving a signal from said means for detecting motion of said machinery that said movable parts of said machinery are located in a predefined position, that said means for enabling motion has been actuated based upon receiving a signal from said means for enabling motion, and that said means for initiating motion has been actuated based upon receiving a signal from said means for initiating motion, providing said means for detecting motion delivers to said controller a signal confirming that said machinery has not been actuated.

13. The system as claimed in claim 12 further comprising one or more encoders designed to determine motion of said machinery, wherein said one or more encoders provide a plurality of optical signals that indicate incremental movement of said machinery.

14. The system as claimed in claim 12 wherein said means for enabling motion of said machinery includes human-interface means with a manual start actuator for startup of said machinery at power-up.

15. The system as claimed in claim 12 wherein said human-interface means includes a manual restart actuator for enabling initiation of said machinery after a safety-interlock state.

16. The system as claimed in claim 12 further comprising means for enabling said movable parts of said machinery to move including a first switching device for initiating movement of said movable parts and a second switching device for initiating movement of said movable parts, wherein said first switching device and said second switching device are controlled by said controller.

17. The system as claimed in claim 12 wherein said means for initiating motion of said machinery includes at least one machine-initiation relay.

18. The system as claimed in claim 17 further comprising human-interface means for initiating movement of said machinery, wherein said human-interface means includes at least one two-hand input device.

19. The system as claimed in claim 17 wherein said means for initiating motion of said machinery includes a make/break/make initiator of a light curtain system.

20. The system as claimed in claim 18 further comprising one or more switch contacts for each of two states of said two-hand input device, wherein one of each of said one or more switch contacts corresponds to one of said two states of said two-hand input device, and wherein said controller includes a separate monitoring channel corresponding to each of said switch contacts.

21. The system as claimed in claim 18 wherein said two-hand input device is monitored on a temporal basis for a comparison of states thereof.

22. The system as claimed in claim 12 wherein said means for detecting motion of said machinery includes one or more encoders and wherein said means for detecting motion of said machinery includes means for receiving and recording pulses from said one or more encoders.

23. The system as claimed in claim 12 wherein said means for determining the positioning of said movable parts includes four position sensors, a first position sensor placeable at a near-top position of a cycle of operation of said machinery, a second position sensor placeable at a dead-top position of said cycle of operation, a third position sensor placeable at a near-bottom position of said cycle of operation, and a fourth position sensor placeable at a dead-bottom position of said cycle of operation.

24. The system as claimed in claim 23 wherein one or more of said position sensors are designed to activate or de-activate a mute state of a light curtain system.

25. The system as claimed in claim 24 wherein each of said position sensors is monitorable by said controller.

26. A control system for monitoring a plurality of events that could result in a hazardous situation if not detected, said system comprising:

a. operator/machine-interface monitoring means;

b. means for monitoring machine motion and for monitoring a machine-motion control device; and c. self-monitoring means for monitoring a safety-related control system, wherein monitoring of each of a plurality of motion-stopping components is achieved within a predetermined time period, wherein said predetermined time period is a time between detection of motion or of an intrusion into a hazard zone of said machine and cessation of movement of movable parts of said machinery.

27. The system as claimed in claim 26 wherein each of said monitoring means operates continuously and in real time.

28. The system as claimed in claim 26 wherein said operator/machine-interface monitoring means, said means for monitoring machine motion and said machine-motion control device, and said self-monitoring means operate concurrently.

29. The system as claimed in claim 26 further comprising means for detecting faults in hardware and software of said system.

30. The system as claimed in claim 29 wherein said means for detecting faults is designed to detect said faults within a predetermined response time.

31. The system as claimed in claim 26 wherein detection of a fault in any one of said monitoring means results in transmittal of one or more machinery-lockout signals of said machine.

32. The system as claimed in claim 26 further comprising means for permitting recovery by an operator of said machine of lockouts resulting from man/machinery interface faults.

33. The system as claimed in claim 26 further permitting means for denying recovery by an operator of said machine of lockouts resulting from machine faults and/or system faults.

34. A homogenous control system for monitoring hazardous machinery, for enabling motion of said machinery, for initiating motion of said machinery, and for initiating a stopping of said machinery, said system comprising a controller with a System microcontroller and an Executive microcontroller, wherein said System microcontroller and said Executive microcontroller are each coupled to, monitor, and control an intrusion-detecting means, a machinery-interface means, and a machinery-stop timing means used to determine whether stopping of said machinery occurs within a proper response time, wherein said System microcontroller and said Executive microcontroller are designed to communicate together so as to ensure synchronization and detection of any disparity of data received from any one of said intrusion-detecting means, said machinery-interface means, and said machinery-stop timing means where, upon the occurrence of said disparity, said System microcontroller and said Executive microcontroller initiate a machinery-stopping means to stop said machinery within a desired period of time and lockout access to said machinery by operating personnel.

35. The system as claimed in claim 34 further comprising a verification means for verifying performance of said stopping means, said timing means, and said motion-initiation means.

36. The system as claimed in claim 34 wherein said controller further includes two-channel signal processing with comparison in order to validate all input signals received from each of said means of said system.

37. The system as claimed in claim 36 wherein said input signals are dynamic.

38. The system as claimed in claim 34 wherein said stopping means includes one or more machine-actuating devices and one or more operator-indicator signals.

39. The system as claimed in claim 34 designed with multiple operating modes, wherein said operating modes are field selectable based upon a user-selected operation-mode input.

40. The system as claimed in claim 39 wherein said operation-mode input is selected from the group consisting of: guard mode, guard-with-manual-machine-initiation mode, automatic mode, mute mode, mute-with-manual-machine-initiation mode, and presence-sensing-device-initiation mode.

41. The system as claimed in claim 40 wherein selection of said operation-mode input is achievable only when said user couples a predetermined machinery-interface device to said machinery.

42. The system as claimed in claim 34 further comprising means for limiting an availability of set-up parameters for operation of said system.

43. The system as claimed in claim 42 wherein said set-up parameters are non-changeable switch selections selected from the group consisting of: mode-of-operation selection, machine-interface selection, and timing settings.

44. The system as claimed in claim 42 wherein said set-up parameters are alterable only within a pre-defined section of operation software of said controller.

* * * * *